(12) United States Patent
Ebert et al.

(10) Patent No.: US 7,756,970 B2
(45) Date of Patent: Jul. 13, 2010

(54) FEEDBACK SYSTEM FOR VISUAL CONTENT WITH ENHANCED NAVIGATION FEATURES

(75) Inventors: Peter S. Ebert, Menlo Park, CA (US); Zia Yusuf, Los Altos, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1150 days.

(21) Appl. No.: 10/963,788

(22) Filed: Oct. 14, 2004

(65) Prior Publication Data
US 2005/0192854 A1    Sep. 1, 2005

Related U.S. Application Data

(63) Continuation-in-part of application No. 10/880,512, filed on Jul. 1, 2004.

(60) Provisional application No. 60/548,097, filed on Feb. 27, 2004, provisional application No. 60/570,139, filed on May 12, 2004.

(51) Int. Cl.
*G06F 15/173* (2006.01)

(52) U.S. Cl. .................. 709/224; 709/219; 702/182; 702/183; 715/701; 715/742; 715/781

(58) Field of Classification Search ........... 709/219, 709/224; 702/182, 183; 715/701, 742, 781
See application file for complete search history.

(56) References Cited

U.S. PATENT DOCUMENTS

| | | | |
|---|---|---|---|
| 5,537,618 A | 7/1996 | Boulton et al. | |
| 5,893,098 A | 4/1999 | Peters et al. | |
| 6,134,531 A | 10/2000 | Trewitt et al. | |
| 6,189,029 B1 | 2/2001 | Fuerst | |
| 6,260,064 B1 * | 7/2001 | Kurzrok | 709/224 |
| 6,421,724 B1 | 7/2002 | Nickerson et al. | |
| 6,477,504 B1 | 11/2002 | Hamlin et al. | |

(Continued)

OTHER PUBLICATIONS

3M, "Post-it® Software Notes: Overview," undated materials, copyright 2003, [online], [retrieved from the Internet on May 7, 2004: http://www.3m.com/market/office/postit/com_prod/psnotes/index.html], 3 pgs.

(Continued)

*Primary Examiner*—Saleh Najjar
*Assistant Examiner*—Thuong T Nguyen
(74) *Attorney, Agent, or Firm*—Fish & Richardson, P.C.

(57) ABSTRACT

A feedback system for visual content is described that allows individual users to obtain feedback regarding selected visual content. The feedback system includes a content navigation enhancer that provides useful navigation and feedback features to a feedback-providing user. When the selected visual content includes a plurality of screens of visual content, the content navigation enhancer may associate an identifier with each of the screens, where each identifier provides a link to its respective screen. The content navigation enhancer may ensure that all of the identifiers are displayed on a user interface, regardless of which screen of visual content is simultaneously displayed on the user interface. Thus, the feedback-providing user has access to all of the screens, regardless of which screen is currently being displayed. Accordingly, the feedback-providing user may select a desired screen to submit corresponding feedback, and may understand a flow or order of the screens of visual content.

31 Claims, 28 Drawing Sheets

U.S. PATENT DOCUMENTS

| | | | |
|---|---|---|---|
| 6,581,071 B1 | 6/2003 | Gustman et al. | |
| 6,606,581 B1 | 8/2003 | Nickerson et al. | |
| 6,618,746 B2 | 9/2003 | Desai et al. | |
| 6,874,125 B1* | 3/2005 | Carroll et al. | 715/705 |
| 6,963,898 B2 | 11/2005 | Yoshimine et al. | |
| 7,313,621 B2 | 12/2007 | Gudorf et al. | |
| 7,428,505 B1* | 9/2008 | Levy et al. | 705/37 |
| 7,478,121 B1 | 1/2009 | Nickerson et al. | |
| 2002/0016848 A1 | 2/2002 | Yoshimine et al. | |
| 2002/0129052 A1 | 9/2002 | Glazer et al. | |
| 2002/0169782 A1 | 11/2002 | Lehmann et al. | |
| 2003/0001887 A1* | 1/2003 | Smith, IV | 345/741 |
| 2003/0005465 A1 | 1/2003 | Connelly | |
| 2003/0050994 A1* | 3/2003 | Pollack | 709/217 |
| 2003/0152904 A1 | 8/2003 | Doty, Jr. | |
| 2004/0019688 A1* | 1/2004 | Nickerson et al. | 709/229 |
| 2004/0049534 A1 | 3/2004 | Nickerson et al. | |
| 2004/0061720 A1* | 4/2004 | Weber | 345/760 |
| 2004/0128183 A1 | 7/2004 | Challey et al. | |
| 2004/0176992 A1* | 9/2004 | Santos et al. | 705/10 |
| 2004/0189716 A1 | 9/2004 | Paoli et al. | |
| 2004/0260781 A1 | 12/2004 | Shostack et al. | |
| 2004/0264447 A1* | 12/2004 | McEvilly et al. | 370/380 |
| 2005/0114366 A1 | 5/2005 | Mathai et al. | |

OTHER PUBLICATIONS

Eight Days, Inc., "Hot or Not," undated materials, copyright 2000-2004, [online], [retrieved from the Internet on May 7, 2004: http://www.hotornot.com/], 4 pgs.

Gadwin Systems, Inc., "Diagram Studio," undated materials, [online], [retrieved from the Internet on May 10, 2004: http://www.gadwin.com/products.htm], 2 pgs.

Gadwin Systems, Inc., "Gadwin PrintScreen," undated materials, [online], [retrieved from the Internet on May 10, 2004: http://www.gadwin.com/printscreen/], 2 pgs.

Microsoft Corporation, "The Customer Experience Improvement Program: Continuing Software Improvement at Microsoft," undated materials, copyright 2000, [online], [retrieved from the Internet Jan. 9, 2004: http://www.microsoft.com/products/ceip/english/default.htm], 3 pgs.

OpinionLab OnlineOpinion Web user feedback system, "A proven system to monitor and improve the online user experience based on continuously listening to visitors across your entire website," reprinted from http://www.opinionlab.com/ printed on Jan. 9, 2004 (1 page).

OpinionLab, Inc., "OpinionLab OnlineOpinion Web User Feedback System: More About OnlineOpinon," undated materials, copyright 2004, [online], [retrieved from the Internet Jan. 7, 2004: http://www.opinionlab.com/more_about_oo.asp], 2 pgs.

OpinionLab, Inc., "The OnlineOpinion System: Different From Other Feedback Techniques," undated materials, copyright 2002, [online], [retrieved from the Internet Jan. 9, 2004: http://www.opinionlab.com/PDF/OnlineOpinion_Different_from_Others.pdf], 3 pgs.

* cited by examiner

FEEDBACK SYSTEM FOR VISUAL CONTENT WITH ENHANCED NAVIGATION FEATURES

CROSS-REFERENCE TO RELATED APPLICATIONS

This application claims priority to U.S. Provisional Application No. 60/570,139, filed May 12, 2004, and titled, "Feedback System for Visual Content With Enhanced Navigation Features." This application is a continuation-in-part of, and claims priority to, U.S. application Ser. No. 10/880,512, filed Jul. 1, 2004, and titled, "FEEDBACK SYSTEM FOR VISUAL CONTENT," which, along with this application, claims priority to U.S. Provisional Application No. 60/548,097, filed Feb. 27, 2004, and titled "FEEDBACK SYSTEM FOR VISUAL CONTENT."

TECHNICAL FIELD

This invention relates to user feedback systems for visual content.

BACKGROUND

A creator of visual content typically strives to ensure that developed visual content is aesthetically pleasing (or at least, aesthetically neutral) and/or effective in communicating a message or purpose of the content creator. For example, a designer of a web site must consider the appearance of the designed web site, while simultaneously ensuring that a purpose and functionality of each portion of the web site are clear to potential users. Similarly, advertisers seek to ensure that their advertisements will attract the attention of a target audience, while also conveying a message regarding the product.

In preparing visual content, it may be difficult for the designer to collect and aggregate feedback regarding either the aesthetic or functional nature of the visual content. For example, it may be difficult for the designer to identify a target audience of appropriate size for receiving and rating the visual content, or it may be difficult to provide the visual content to such a target audience. Even if the visual content is distributed to a selected target audience of appropriate size, it may be difficult for both the audience members and the designer of the visual content to provide/use the feedback in an effective way.

For example, if a user emails visual content to a number of other users (or posts content to a publicly-available website), the receiving/viewing users must find a way to verbally describe their opinions regarding the visual content, which may be cumbersome and ambiguous (for example, a receiving user might discuss a proposed web site design by saying that "the button in the upper left-hand corner next to the 'submit' button has an unclear function"). Generally speaking, then, the result of seeking feedback in this way is likely to be a string of responses (e.g., reply emails) that the originating user must individually read through in order to compile meaningful information and discard (or request follow-up on) ambiguous information.

Additionally, to the extent that such feedback requires effort and time on the part of receiving users, it becomes less likely that the receiving users will provide meaningful feedback at all. Somewhat similarly, if the originating user feels that the benefit from sifting through such feedback is outweighed by the non-trivial effort of making the visual content available in the first place, then the originating user may be less likely to solicit meaningful, large-scale feedback. This may be particularly true when a project or design must go through multiple revisions, since it may be difficult to correlate each revision with corresponding feedback for the purposes of comparison and tracking of progress.

Some conventional feedback systems do exist for providing feedback on visual content, and some of these may be operated in a centralized or standardized manner. However, such systems are typically limited to high-level opinions of the visual content as a whole (or of pre-defined portions), such as, for example, ranking an opinion of a picture on a scale of one to ten. Even if such systems provide an opportunity for viewing users to provide more detailed opinions than a simple ranking, the same problems discussed above may still arise (e.g., cumbersome for the viewing users to provide comment, and difficult to compile results). Moreover, such systems, even to the extent that they exist, are not typically available for use and control by any user, but are more likely implemented by a centralized administrator.

SUMMARY

According to one general aspect, a system includes a feedback system operable to receive first visual content and second visual content from a first user and provide the first and second visual content to a second user together with feedback elements for obtaining feedback from the second user regarding the first and second visual content, and a content navigation enhancer operable to associate a first identifier with the first visual content and a second identifier with the second visual content, where the first identifier provides access to the first visual content and the second identifier provides access to the second visual content, during the obtaining of feedback from the second user.

Implementations may include one or more of the following features. For example, the feedback system and the content navigation enhancer may be operable to generate a user interface in which the first identifier and the second identifier are simultaneously displayed to the second user in conjunction with the first visual content, such that the second user has access to the second visual content through the second identifier. In this case, the content navigation enhancer may be operable to scale a size of the first and second identifiers within the user interface, such that the first identifier, the second identifier, and any other identifiers associated with other visual content received from the first user, are constantly visible within the user interface during the display of the first visual content.

The content navigation enhancer may be operable to determine a sequential order of the first and second visual content, such that the first and second identifiers are generated within the user display so as to represent the sequential order. In this case, the content navigation enhancer may be operable to receive the sequential order from the first user.

The content navigation enhancer may be operable to display the first identifier differently from the second identifier when the first visual content is displayed with the user interface. The content navigation enhancer may be operable to mark the first identifier on the user interface in response to a submission of feedback regarding the first visual content by the second user, and/or may be operable to provide information regarding the second visual content in response to a selection of the second identifier by the second user, while the first visual content is displayed on the user interface. Further, the content navigation enhancer may be operable to provide a grabber tool within the user interface that allows the second user to view selected portions of the first visual content when the first visual content is too large to be entirely displayed within a display of the user interface.

The feedback system may be operable to receive feedback from the second user regarding the first visual content, and may be further operable to receive revised feedback from the second user regarding the first visual content, and update the feedback based on the revised feedback.

The system may include an administration service operable to provide the first and second visual content and feedback elements to the second user as part of a feedback campaign that is individually-tracked with respect to the first user, and the administration service may be further operable to provide the first user with results of the feedback campaign. In this case, the administration service may be operable to store the visual content and the feedback in association with the feedback campaign and the first user.

The feedback elements may include a virtual note creator, where the virtual note creator may be operable to allow the second user to place a virtual note on a selected portion of the first or second visual content and thereby provide specific feedback regarding the selected portion. In this case, the virtual note creator may be operable to generate color-coded virtual notes, and each color code may correspond to a specified type of feedback. Further, the virtual note creator may be operable to generate virtual notes that, once placed on the selected portion, are expanded or collapsed by a selection of the first or second user to view the contents thereof.

According to another general aspect, first visual content and second visual content are received from a first user. The first visual content is associated with a first identifier, and the second visual content is associated with a second identifier. The first identifier and second identifier are provided to a second user, for display on a user interface together with the first visual content, and feedback elements are provided through the user interface for receiving feedback from the second user. The feedback is received from the second user, by way of the feedback elements.

Implementations may include one or more of the following features. For example, in associating the first visual content with the first identifier, access may be provided to the first visual content through the first identifier, and, in associating the second visual content with the second identifier, access to the second visual content may be provided through the second identifier.

In providing the first identifier and second identifier, the first identifier and the second identifier may be provided in an order corresponding to a sequential order of the first visual content and the second visual content, and/or the first identifier may be displayed differently from the second identifier while the first visual content is displayed with the user interface. Further, information regarding the second visual content may be provided in response to a selection of the second identifier by the second user, while the first visual content is displayed on the user interface. The first identifier may be marked on the user interface in response to receiving feedback from the second user regarding the first visual content.

The feedback may be received from the user regarding the first visual content, revised feedback may be received from the second user regarding the first visual content, and the feedback may be updated, based on the revised feedback. Providing feedback elements through the user interface may include providing a virtual not creator for allowing the second user to select color-coded virtual notes for placement on selected portions of the first visual content. Also, the first and second visual content, a user identifier associated with the first user and a feedback campaign for obtaining feedback from the second user regarding the first and second visual content, the feedback, and the feedback campaign may be maintained in association with one another.

According to another general aspect, a user interface includes a first portion for displaying first visual content on which feedback is sought from a viewing user, a second portion for displaying a first identifier associated with the first visual content and for displaying a second identifier associated with second visual content, and a third portion for displaying feedback elements that are available to the viewing user for providing feedback regarding the first visual content.

Implementations may include one or more of the following features. For example, selection of the second identifier by the viewing user may cause display of the second visual content within the first portion of the user interface, to thereby enable the viewing user to provide feedback regarding the second visual content using the feedback element.

In this case, an order of the first identifier and second identifier within the second portion may correspond to a sequential order of the first visual content and the second visual content. The first identifier may be displayed differently from the second identifier within the second portion when the first visual content is displayed within the first portion.

The first identifier may be marked in response to a submission of the feedback from the viewing user regarding the first visual content. The third portion may include a submit button that is displayed as a re-submit button upon submission of the feedback regarding the first visual content, when the first visual content is displayed in the first portion. The second identifier may display information about the second visual content within the second portion, upon selection of the second identifier by the viewing user, while the first visual content is displayed in the first portion.

The details of one or more implementations are set forth in the accompanying drawings and the description below. Other features will be apparent from the description and drawings, and from the claims.

DESCRIPTION OF DRAWINGS

FIGS. 4-16 are screenshots of a first implementation of the system of FIG. 1.

FIGS. 17-21 are screenshots of a second implementation of the system of FIG. 1.

DETAILED DESCRIPTION

Figure 1:
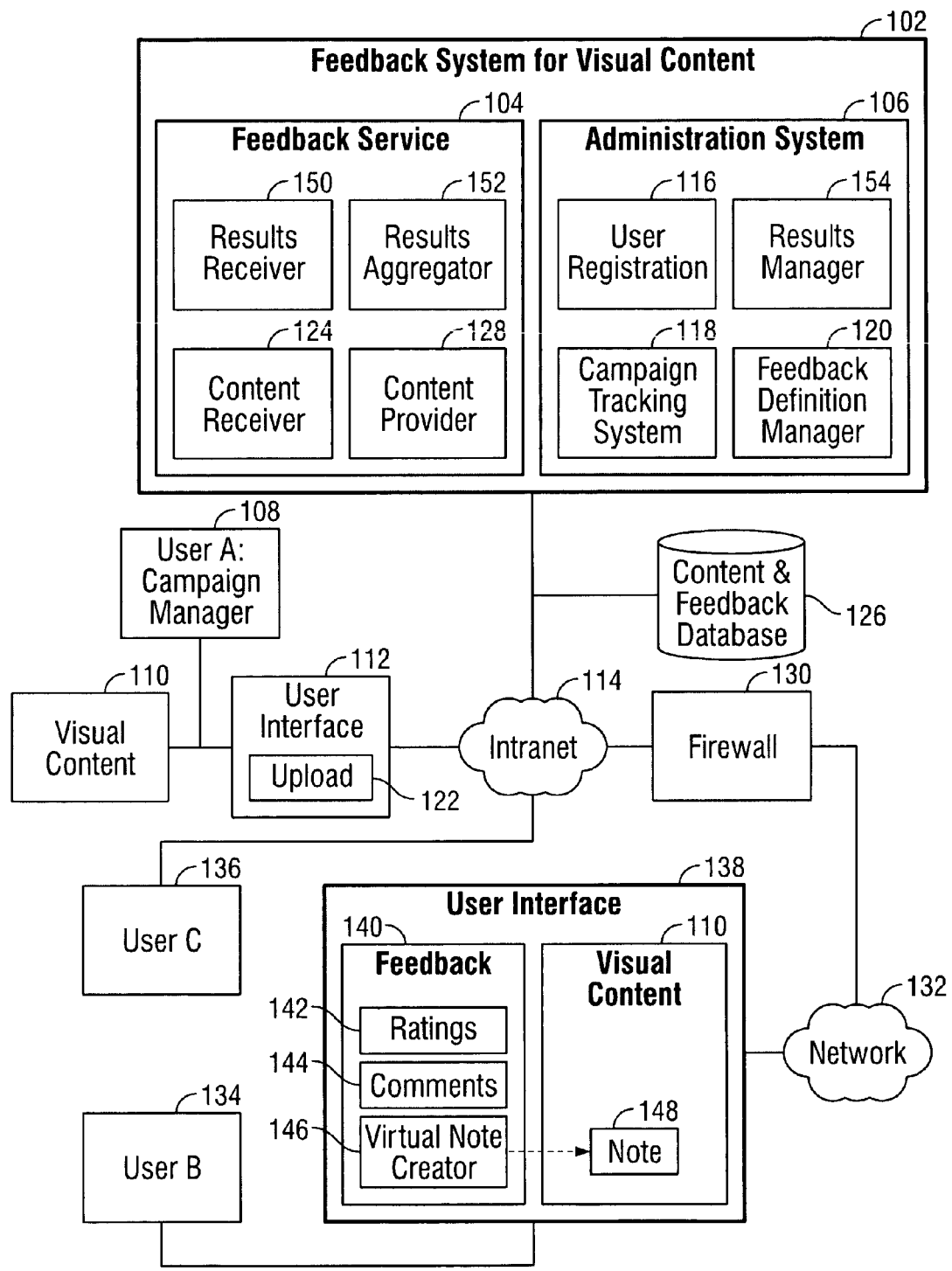
FIG. 1 is a block diagram of a feedback system for visual content.

FIG. 1 is a block diagram of a feedback system 102 for visual content. In FIG. 1, the system 102 includes a feedback service 104 for obtaining feedback from users, and an administration system 106 for allowing a managing user to create and oversee a particular campaign for feedback regarding one or more pieces of visual content.

In particular, in FIG. 1, a user A 108 is a campaign manager who has created or otherwise obtained a piece or pieces of visual content 110, and who wishes to conduct a campaign to obtain feedback from other users regarding the visual content 110. Accordingly, this campaign manager 108 uses a local user interface 112 to access an intranet 114. The intranet 114 may represent, for example, an enterprise-wide network, or any other type of private or semi-private computer network.

The campaign manager 108 accesses a user registration service 116 to register as a campaign manager and gain eligibility to use the feedback system 102. For example, the campaign manager may select a username and password, and receive permission to create and operate one or more campaigns for obtaining feedback.

Once the campaign manager 108 is registered, the campaign manager 108 accesses a campaign tracking system 118 to define at least an initial campaign. That is, the campaign manager 108 may define a name, duration, visual content nature, or other characteristic of the feedback campaign to be conducted. In this way, the campaign tracking system 118 creates a feedback campaign that is specific to the campaign manager 108 and to particular pieces of visual content 110, so that future feedback may be tracked and managed accordingly.

The campaign manager 108 also may access a feedback definition manager 120, with which the campaign manager 108 may provide comments about the relevant visual content, and/or define the type of feedback that is being sought. For example, a pre-determined list of feedback questions may exist, from which the campaign manager 108 may select for inclusion in the particular campaign being conducted.

The campaign manager 108 may then upload the visual content to the feedback system 102, using an upload functionality 122 of the user interface 110. In one implementation, a content receiver 124 provides a screen to the campaign manager 108, where the campaign manager 108 may simply "drag and drop" a locally-saved piece of visual content 110 to the screen. The content receiver 124 may operate in conjunction with the campaign tracking system 118 to ensure that the visual content 110 is continuously and properly associated with its corresponding campaign.

In another implementation, software may be included locally to the campaign manager 108 for uploading content in an easy, integrated manner. For example, a software application may be configured for convenient uploading of the visual content 110 to the feedback system 102. In one implementation, the campaign manager 108 may be viewing visual content anywhere on a local computer (e.g., scanned photographs, or a currently-viewed web site), and may simply hit the upload button 122, whereupon the campaign manager 108 is immediately queried as to which campaign the visual content 110 should be included. The upload button 122 may be a standard keyboard key, such as, for example, the "printscreen" key, with appropriately-assigned functionality, or may be assigned to a right-button function of a standard mouse device.

Similar software is provided by Gadwin Systems, Inc., which produces a freeware "PrintScreen" product for screen capture. Such a product, or a similar product, may be used to integrate the inclusion of comments regarding the visual content when uploading. Other screen capture features may be used, separately or in conjunction with such software. For example, the uploading user 108 may have an option to blur or obscure desired portions of the visual content, which may be confidential or irrelevant.

The content receiver 124 may store the visual content 110 in a database 126. As discussed in more detail below, the database 126 also may be used to store feedback information received from users, and also may be used by the campaign tracking system 118 or other related systems to store campaign or other information, as needed. Of course, other/separate databases may be used for these purposes, and the database 126 may be internal or external to the feedback system 102.

Once the visual content 110 has been uploaded and stored in the context of a particular campaign, and the campaign manager 108 has defined/included any comments or questions to be included with the visual content, a content provider 128 makes the visual content and related information available to a defined pool of users. For example, the content provider 128 may email a link to the users, with an invitation or instruction regarding the link. As another example, the content provider 128 may include the visual content 110 and related information within an email to the users.

In FIG. 1, a firewall 130 provides security to users of the intranet 114, and shields communications traffic over the intranet 114 from being intercepted or disrupted by users of a public network 132, which may be, for example, the public Internet or other public ally-available network. In this way, users of the intranet 114 may communicate securely and safely. Thus, in FIG. 1, the campaign manager 108 and other users of the intranet 114, such as, for example, employees of an enterprise running the intranet 114, may be provided access to the feedback system 102 as a benefit of employment. Nonetheless, the campaign manager 108 and other intranet users may be able to gain feedback from selected users, even those outside of the firewall 130 and on the public network 132. Of course, the feedback service 102 also may be operated over the publicly-available network 132, as a free or pay service to all users thereof.

In FIG. 1, the content provider 128 provides the visual content 110 and associated information to a user B 134 and a user C 136. It should be noted that the user C 136 is behind the firewall 130 and accesses the intranet 114, while the user B 134 is outside of the firewall 130 and accesses the public network 132. In this way, feedback campaigns may be conducted that include only internal users, or only external users, or some combination of the two user groups.

In FIG. 1, the user B 134 accesses a user interface 138 that displays the visual content 110 previously uploaded by the campaign manager 108 as described above. The user interface 138 also displays a feedback portion 140, with which information from the campaign manager 108 may be displayed, and feedback from the user B 134 may be collected.

The feedback portion 140 includes a ratings section 142, a comments section 144, and a virtual note creator 146. The ratings section 142 may include, for example, pre-defined questions with associated rating scales. For example, a question such as "what is your overall impression?" may be included with a selection scale of 1-5. Other questions or selection scales, previously determined by the campaign manager 108 and/or the feedback system 102, also may be included.

Also in the ratings section 142, rankings from the user B 134 and other users may be automatically displayed, as the user B 134 continues to provide feedback. For example, if the user B 134 answers a question about a portion of the visual content 110 by assigning a ranking to that portion, then, upon submission of the ranking, the rankings section 142 may display a cumulative ranking of the visual content portion, so that the user B 134 may receive information about feedback provided by other users.

The comments section 144 may refer to comments from the campaign manager 108, which may be displayed beside the visual content 110, or may be overlaid on a relevant portion of the visual content 110. Additionally, or alternatively, the comments section 144 may refer to an open interaction element which the user B 132 may use to enter freeform text regarding feedback on the visual content 110.

The virtual note creator 146 refers to a functionality that allows the user B 134 to provide pre-defined or free-form feedback regarding specific portions of the visual content 110. That is, the user B 134, by selecting the virtual note creator 146, may generate a virtual note 148 that the user B 134 may then freely place anywhere within or around the visual content 110. In this way, the user B 134 may provide specific comment on a particular portion of the visual content 110, without having to provide a written description of the particular portion of the visual content 110 in order to give context to the comment(s).

As shown below, the virtual note 148 may include a drop-down menu, ranking scale, or other pre-defined feedback type. The virtual note 148 also may include a box for allowing the user B 134 to enter free-form text comments. In this way, feedback entered using the virtual note 148 may be tracked and used in different ways. For example, although the virtual note 148 may include the above-described options for enabling the user B 134 to enter feedback, it is also possible that the virtual note 148 conveys information simply by its presence, without additional comment from the user B 134. For example, the virtual note 148 may be a red or green dot, used to generally and quickly imply negative or positive feedback, respectively, with respect to the portion of the visual content 110 where the dot(s) is placed.

Once the user B 134 has finished inputting feedback on the visual content 110, a results receiver 150 within the feedback service 104 receives the results and interacts with the campaign tracking system 118 to ensure that the results are properly associated with their respective campaigns. Then, the results may be input to a results aggregator 152 for accumulating information about the feedback, again with respect to a particular campaign.

For example, the results aggregator 152 may determine a composite rating for any pre-defined feedback scales (e.g., may determine that users gave an overall average impression of 4 on a scale of 1 to 5). The results aggregator 152 may accumulate such results from the virtual notes 148, and may aggregate the results across users, across different pieces/versions of visual content, or across different portions of the same visual content. In this way, information may be easily gleaned about problem areas experienced by users.

A results manager 154 allows the campaign manager 108 to manage the results as aggregated by the results aggregator 152. For example, the campaign manager 108 may select different views or compilations of the same results, or may view results across different campaigns. The campaign manager also may use various other applications to view the results. For example, results data may be downloaded into an Excel worksheet, or a PowerPoint presentation. In the case of an Excel worksheet, locations of the virtual notes may be recorded as x/y coordinates defined with respect to the visual content.

In the above description, the feedback system 102 is illustrated as containing the feedback service 104, which primarily relates to functionality that is typically common to all campaign managers, and the administration system 106, which primarily relates to the experience of individual campaign managers as they define, track, and use one or more campaigns. However, this functionality is merely one example, and it should be understood that the above areas of functionality are not intended to be restrictive, and could be defined or operated in a different manner.

For example, the functionality of the results aggregator 152 and the results manager 154 may overlap to some extent. As another example, some of the functionality of the feedback system 102 may be implemented locally by the campaign manager 108. For example, the upload functionality associated with the content receiver 124 and the upload 122 may be implemented locally.

In FIG. 1, it should be understood that the feedback system 102 provides a quick and easy method for internal and external end-users to provide feedback on visual content, including, for example, current or upcoming user interface designs. Individual users can self-register, create, manage, and analyze feedback campaigns. Internal and external users can rate, comment, and attach virtual notes to the visual content, and results of the feedback are immediately available to the initiating end-user. Moreover, as the user B 134 rates a first piece of visual content (or portion thereof) and views a second piece of visual content, results of feedback for the first piece of visual content may be instantly displayed to the user B 134. That is, the user B 134 may see a compilation (e.g., average rating) for the first piece of visual content, including the feedback provided by the user B 134.

As a result, the initiating end-user (e.g., the campaign manager 108) may feel empowered to shape his or her own work environment and business processes. Users expressing feedback feel that their opinion is desired and useful. An operator of the feedback system 102, e.g., an employer running the enterprise-wide intranet 114, may benefit from motivating and enabling internal and external end-users to continually provide feedback concerning new screen designs or screen sequences, while incorporating end-user expertise, creativity, and intelligence into the design of user interfaces and other visual content. Additionally, such an employer may have system-wide administrative and reporting capabilities for managing use of the feedback system 102.

Figure 2:
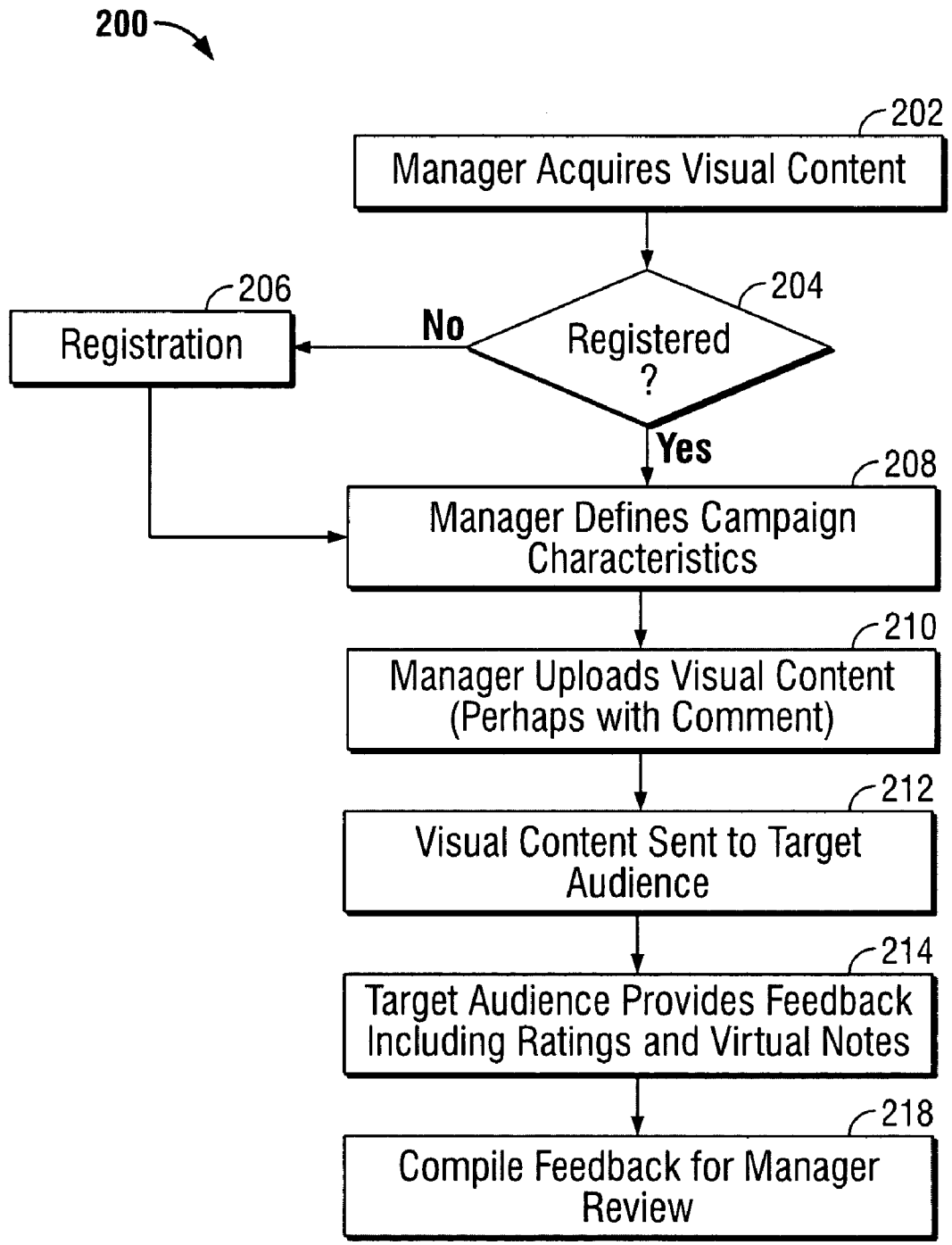
FIG. 2 is a flowchart illustrating a process for using the system of FIG. 1.

FIG. 2 is a flowchart illustrating a process for using the system of FIG. 1. In FIG. 2, the campaign manager 108 acquires the visual content 110 (202). This may mean scanning, downloading, or otherwise creating a file that is in a format compatible with the feedback system 102 (e.g., JPEG).

If the campaign manager 108 is not registered (204), then the campaign manager 108 may register by, for example, providing a username (or other identifier) and password (206). Then, or if the campaign manager 108 is previously registered, the campaign manager 108 may define characteristics of the campaign to be conducted (208). For example, the campaign manager 108 may decide that the campaign should have a particular list of recipients, or should have particular start and end dates.

The campaign manager 108 then uploads the previously-acquired visual content (210). As already mentioned, uploading may occur by a "drag-and-drop" process of placing a saved version of the visual content into a user interface screen for displaying the visual content of the campaign being conducted. Alternatively, the uploading may be an integrated process that facilitates uploading of visual content with a local environment of the campaign manager 108.

The visual content 110 and any associated comments or instructions are then sent to a target audience of users (212), who provide their feedback using any of the available techniques, including the pre-defined ratings and/or virtual notes (214).

Finally, this feedback is compiled for viewing and consideration by the campaign manager 108 (218). Conveniently, the campaign manager 108 is able to view the feedback using any conventional browser software, simply by accessing the feedback system 102 and providing an appropriate user id and password.

Figure 3:
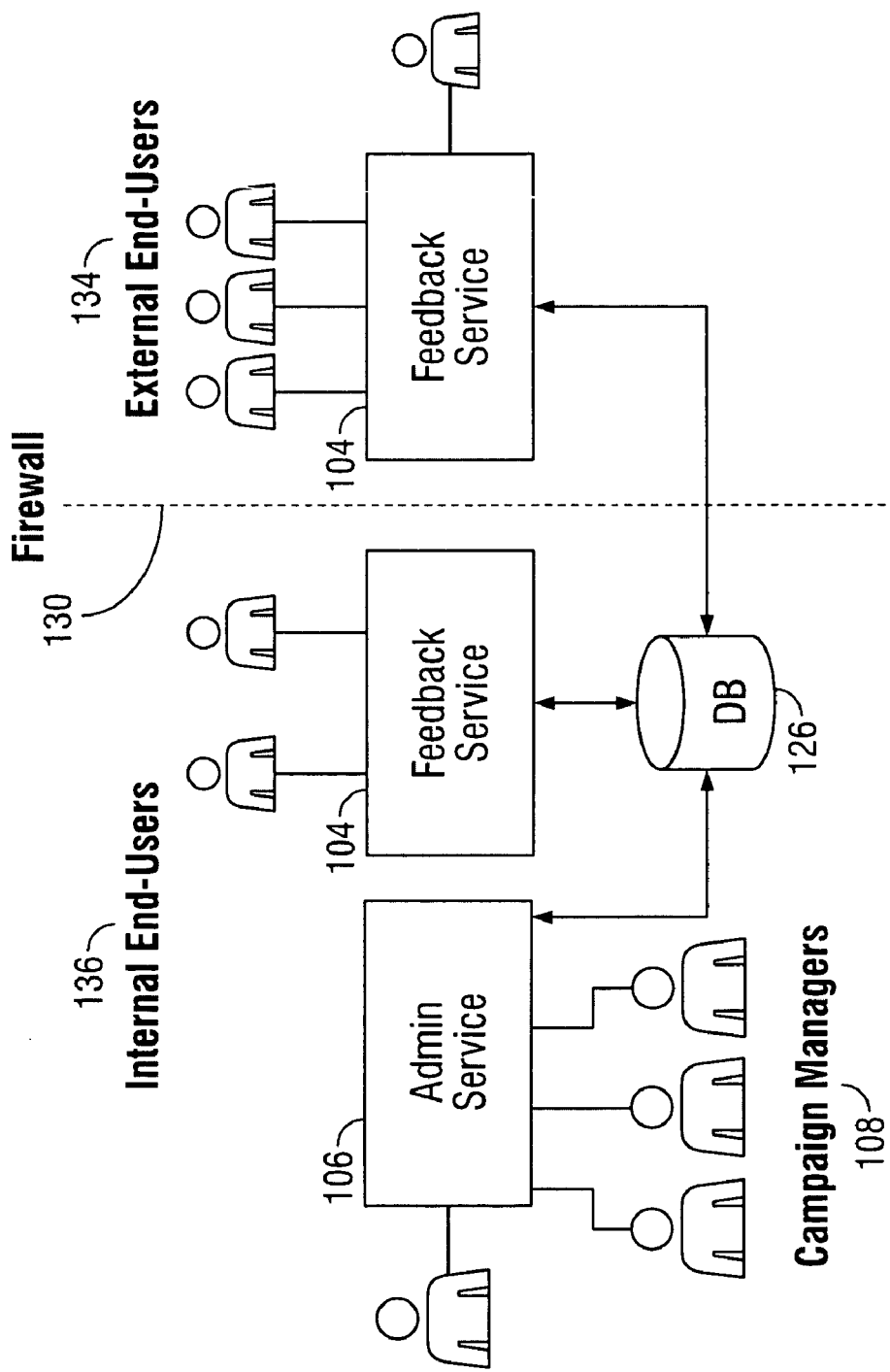
FIG. 3 is a diagram of one implementation of the system of FIG. 1.

FIG. 3 is a diagram of one implementation of the system of FIG. 1. In FIG. 3, the functionality of the feedback system 102 is architected such that the campaign managers interact primarily or completely with the administration service or system, while the feedback service interacts with the audience of users, whether internal or external to the firewall. As in FIG. 1, the campaign managers can instantly create and run internal and external feedback campaigns, and are able to see and manage their visual content and feedback information.

Figure 4:
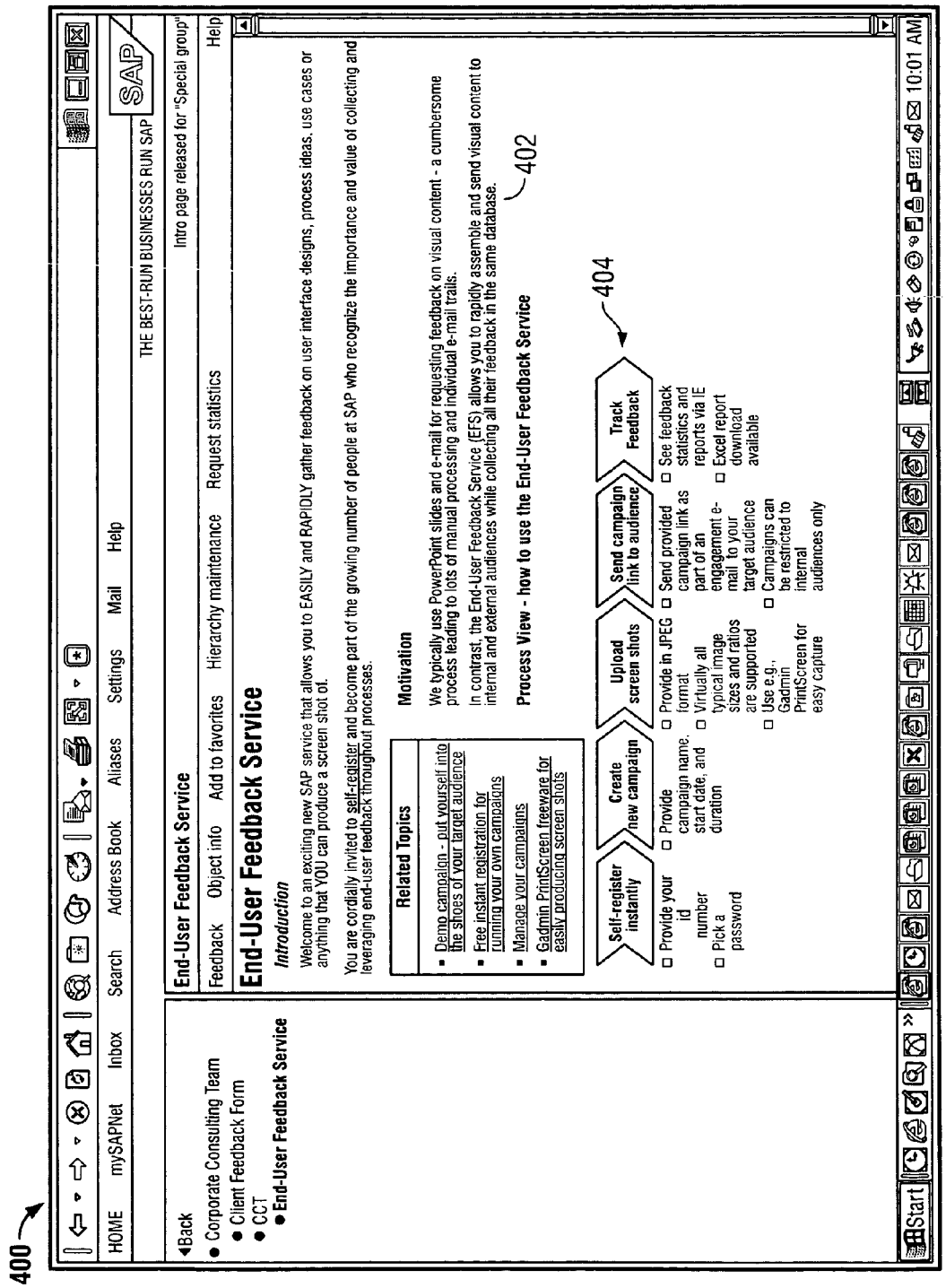

FIGS. 4-16 are screenshots of a first implementation of the system 102 of FIG. 1. In FIG. 4, an introductory screen 400 provides information regarding an initial use of the system 102 of FIG. 1. Specifically, a section 402 describes the system 102 and some of its associated advantages, while a section 404 provides an overall process flow of how to use the system 102, similar to the process described above with respect to FIGS. 1 and 2.

Figure 5:
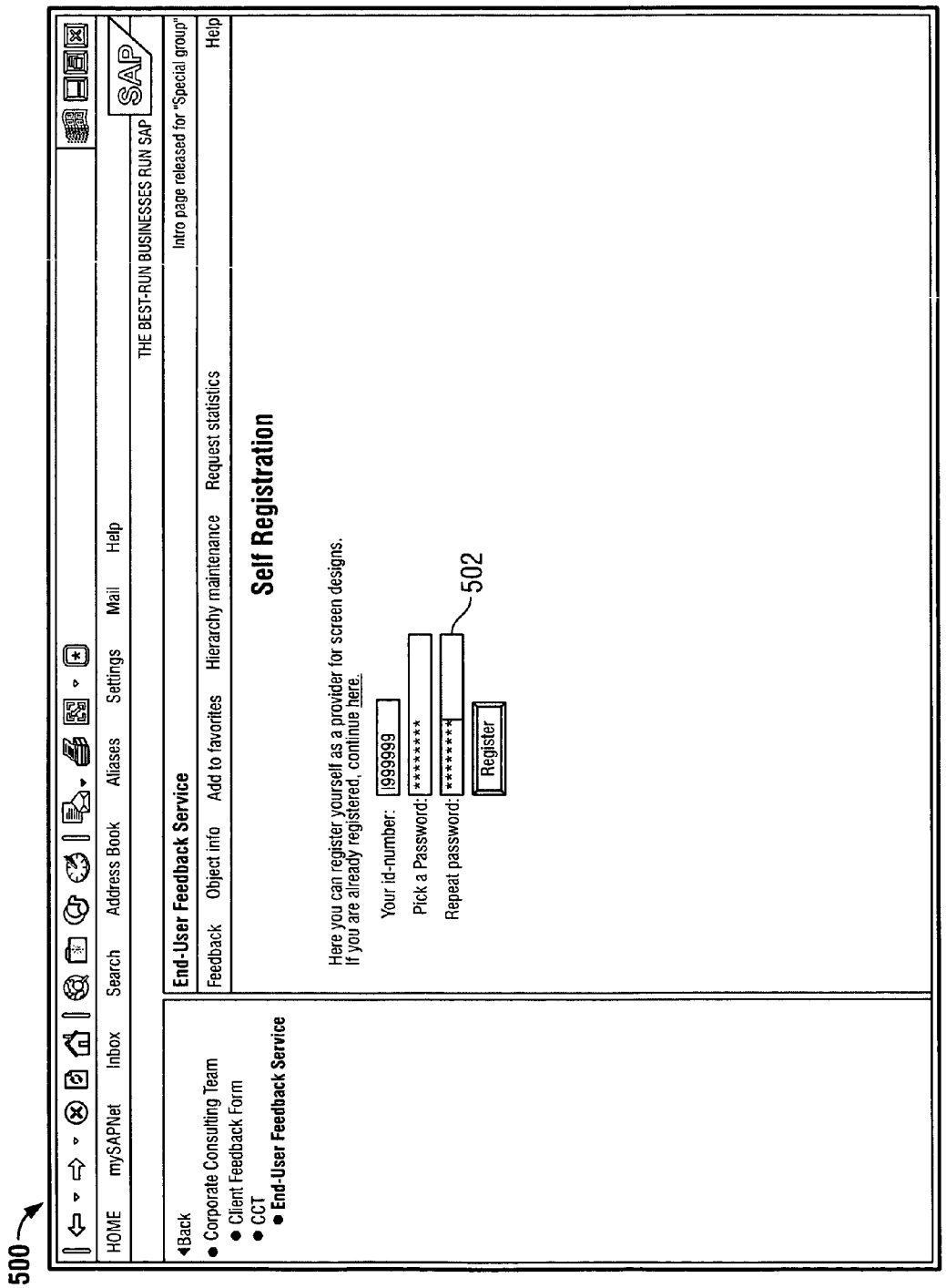

In FIG. 5, a screen 500 illustrates an example of a self-registration screen, in which the campaign manager 108 provides an identifier number (id) and password information into a section 502. It should be understood that this self-registration feature provides an easy and convenient way for the campaign manager 108 to use the feedback system 102, without requiring assistance or involvement of an administrator of the system 102. Also, if a user has previously registered, then a separate screen may be used to allow registered users to access the system 102 (i.e., login to the system 102) by re-entering their user id and password.

Figure 6:
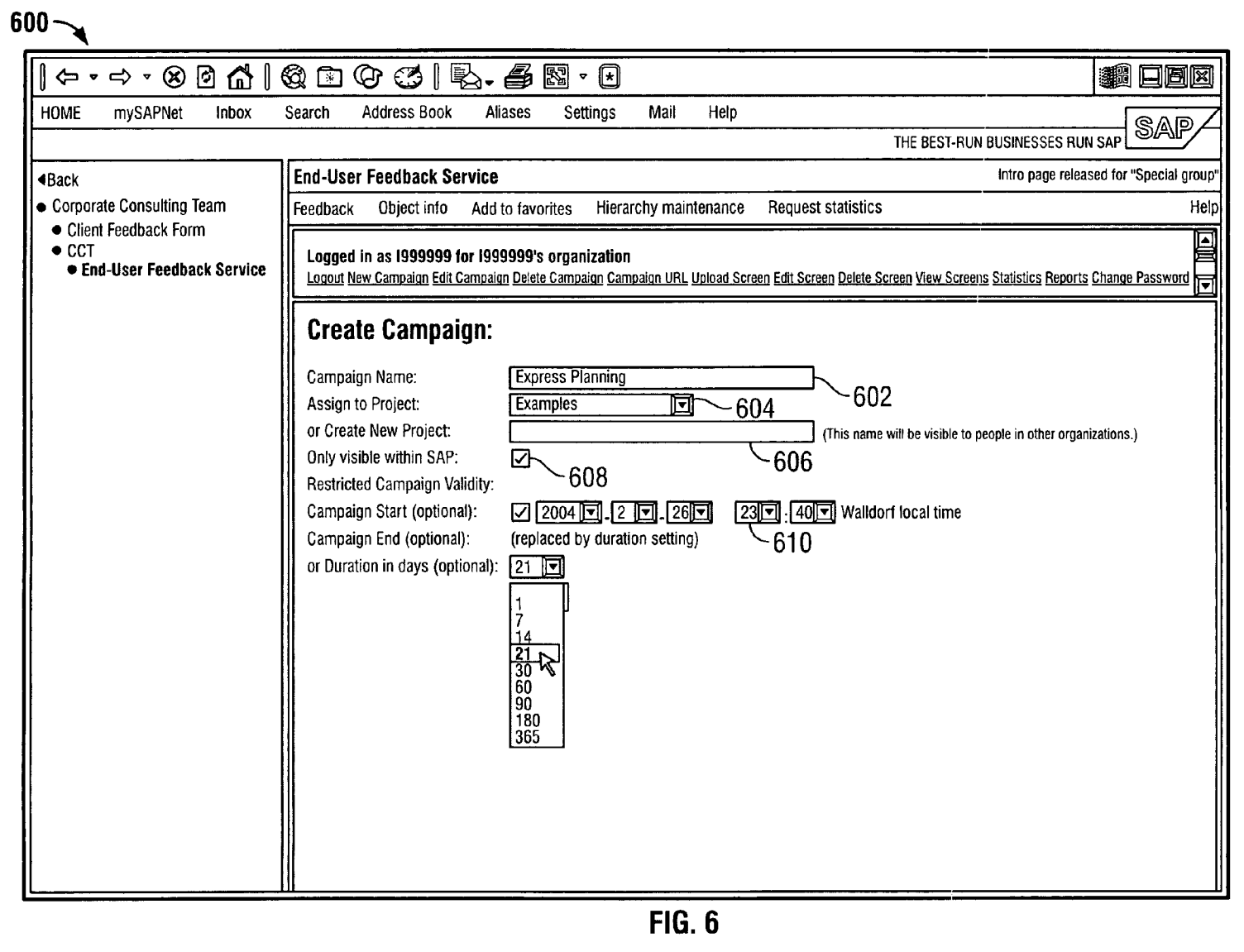

In FIG. 6, a screen 600 allows the campaign manager 108 to create a new campaign for obtaining feedback regarding one or more pieces of visual content. In FIG. 6, the campaign manager 108 names the campaign "Express Planning" in a section 602, and associates the campaign with an existing or new project, using sections 604 and 606, respectively.

Then, the campaign manager 108 may restrict visibility or use of the campaign to users of the intranet 114 using a section 608. Finally, in a section 610, the campaign manager 108 may designate a start date, end date, and/or duration of the campaign.

Figure 7:
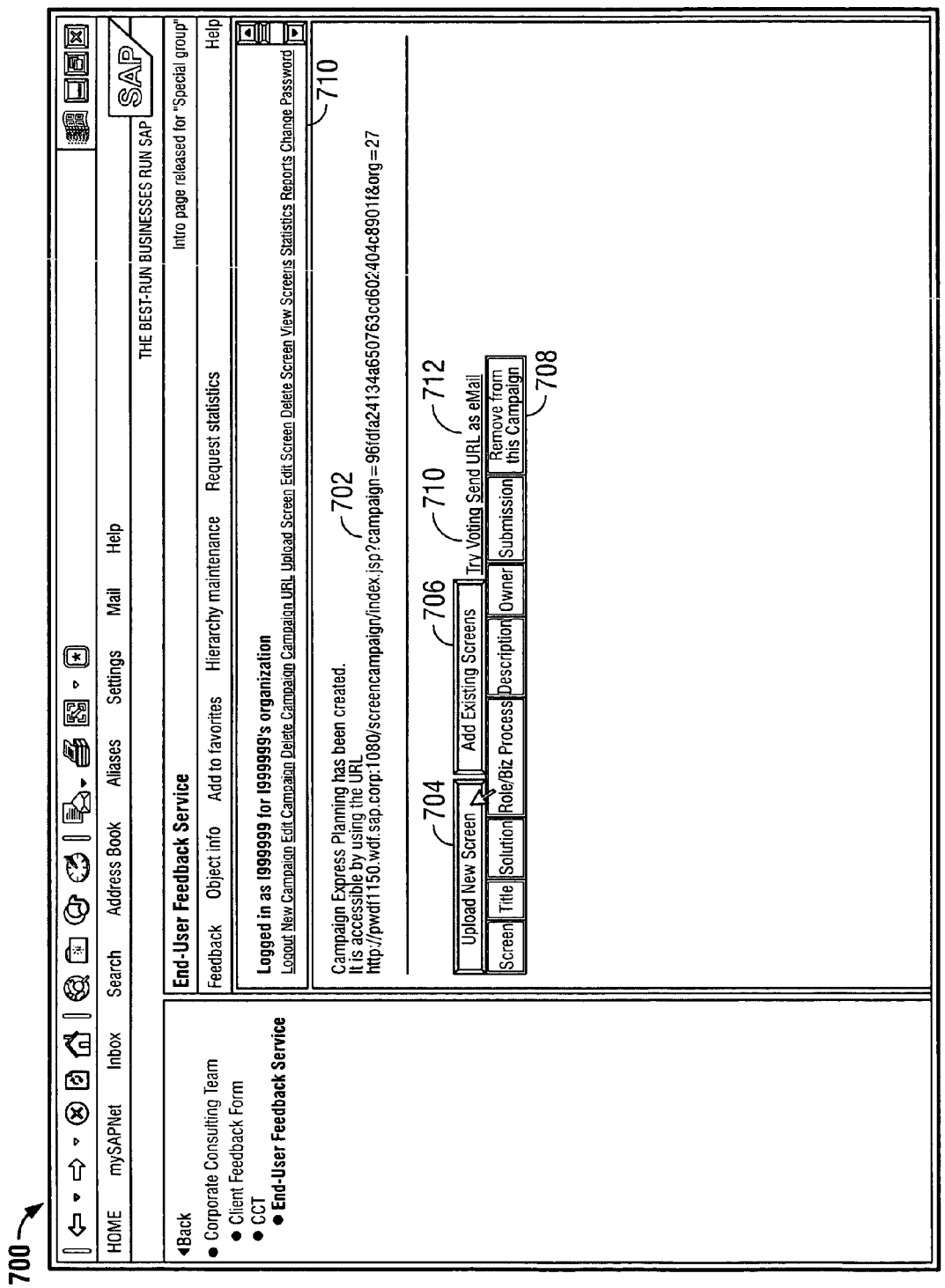

FIG. 7 is a screenshot of a screen 700 for administrating the campaign. In a section 702, the campaign manager 108 may access the campaign by way of the provided Uniform Resources Locator (URL). As will be seen, the campaign manager 108 may upload visual content (e.g., a screen design) using a button 704, or may add an already-uploaded screen using a button 706. A table 708 categorizes information about visual content to be added to the campaign, while a link 710 provides access to voting on the visual content and a link 712 allows the campaign manager 108 to send the URL as part of an e-mail message.

Finally, a section 710 provides access to various administrative functionalities, including management of campaigns (e.g., adding, editing, or deleting a campaign, or accessing a campaign URL), as well as management of individual screens within campaigns (e.g., adding, editing, deleting, or viewing screens). The section 710 also allows the campaign manager 108 to access statistics or reports regarding feedback results from a particular campaign or regarding a particular piece of visual content.

Figure 8:
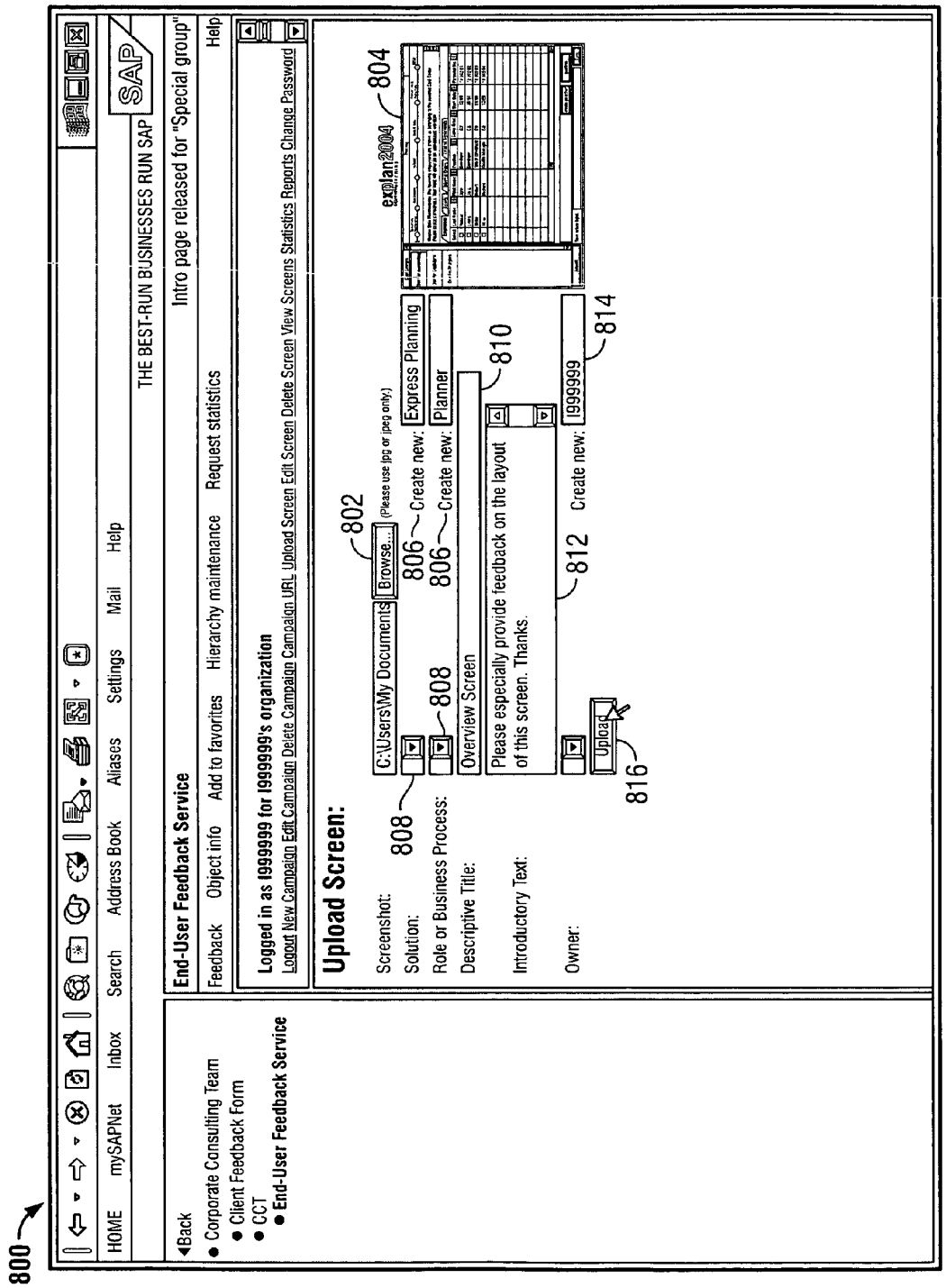

In FIG. 8, a screen 800 is shown for uploading visual content. The screen 800 includes a section 802 for uploading the visual content from a selected storage location, resulting in selection of a screen 804. Sections 806 and 808 allow the campaign manager 108 to associate the screen 804 with a new campaign/category, or with an existing campaign/category, respectively.

A section 810 allows the campaign manager 108 to enter a title for the screen 804, while a section 812 allows the campaign manager 108 to enter introductory text for the screen 804. Finally, a section 814 allows the campaign manager 108 to enter an appropriate new or existing user id number associated with the campaign, while a button 816 serves to activate uploading of the screen 804 to the campaign.

Figure 9:
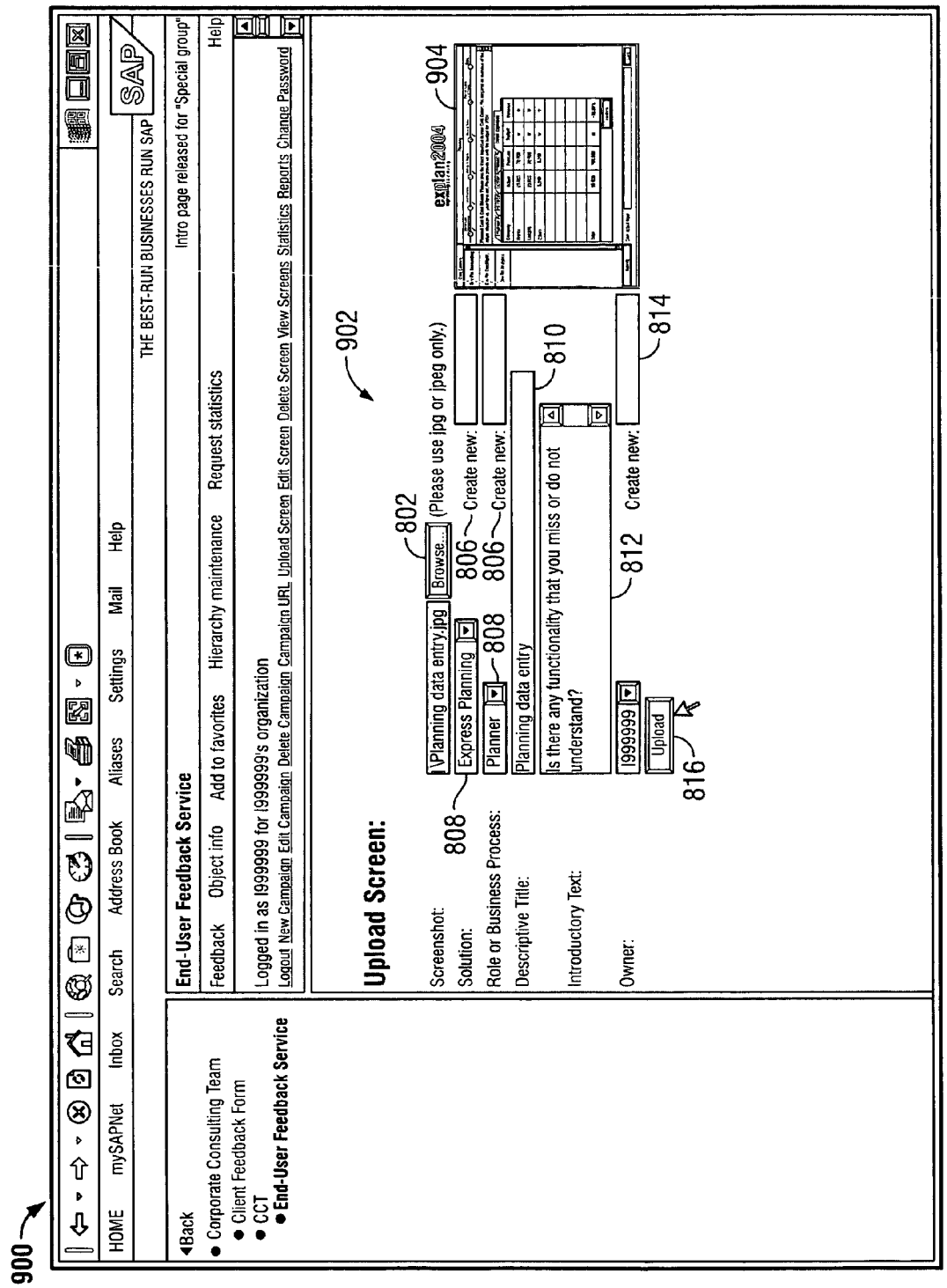

In FIG. 9, a screen 900 includes a section 902 for uploading an additional screen 904 to the "Express Planning" campaign. Remaining sections of the screen 900 correspond to similarly-numbered sections of screen 800, but with information corresponding to the screen 904.

Figure 10:
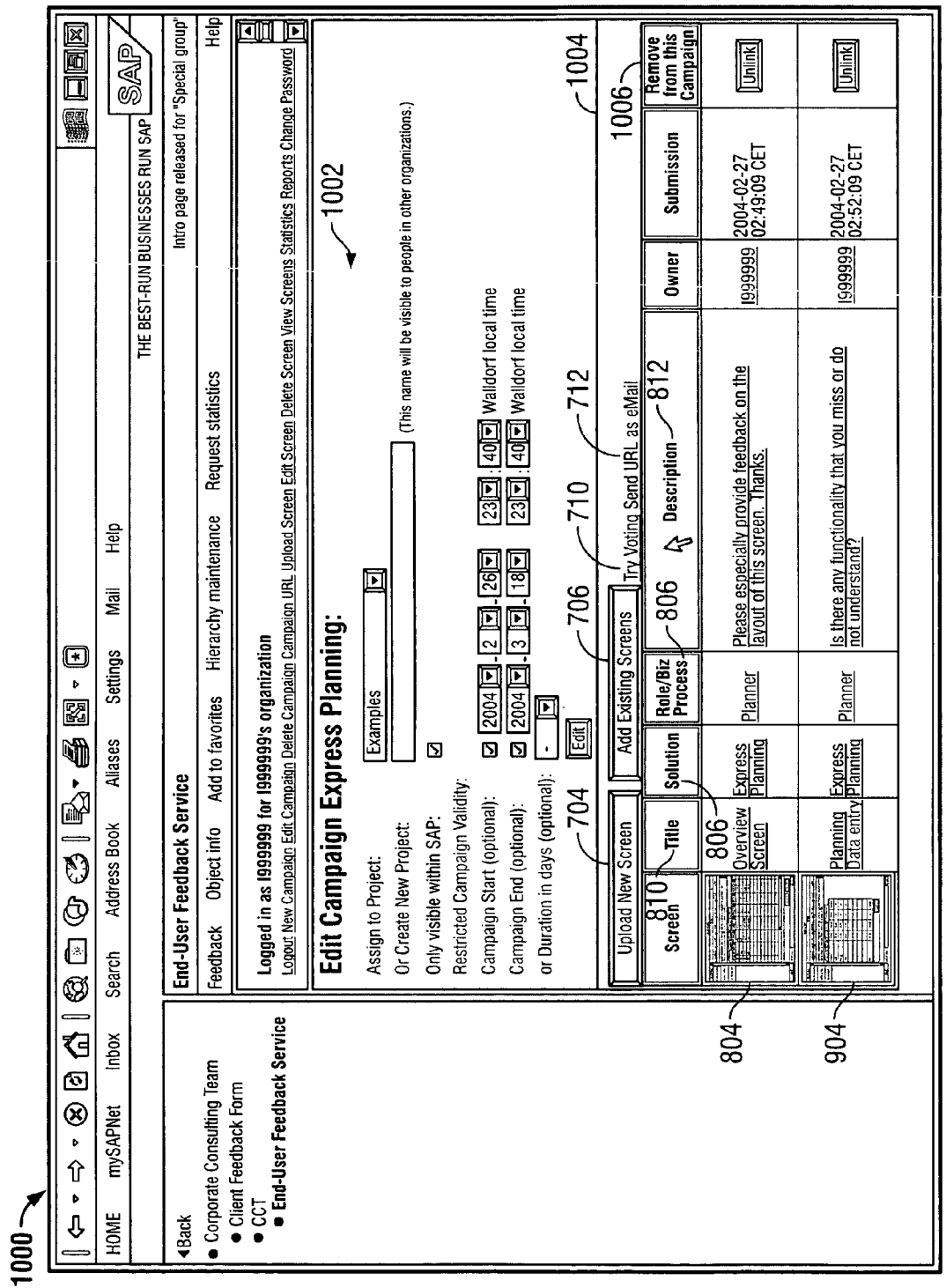

In FIG. 10, a screen 1000 allows the campaign manager 108 to edit a selected campaign by displaying relevant information about the campaign within a section 1002. A section 1004 provides thumbnail images of the screens 804 and 904 that are included within the campaign, along with the various types of information described above with respect to FIGS. 8 and 9, and any other relevant information that the campaign manager 108 may deem useful that is available from the system 102, including, for example, a section 1006 of the section 1004 that allows the campaign manager 108 to easily remove or unlink a selected one of the links 804 and 904 from the campaign.

Figure 11:
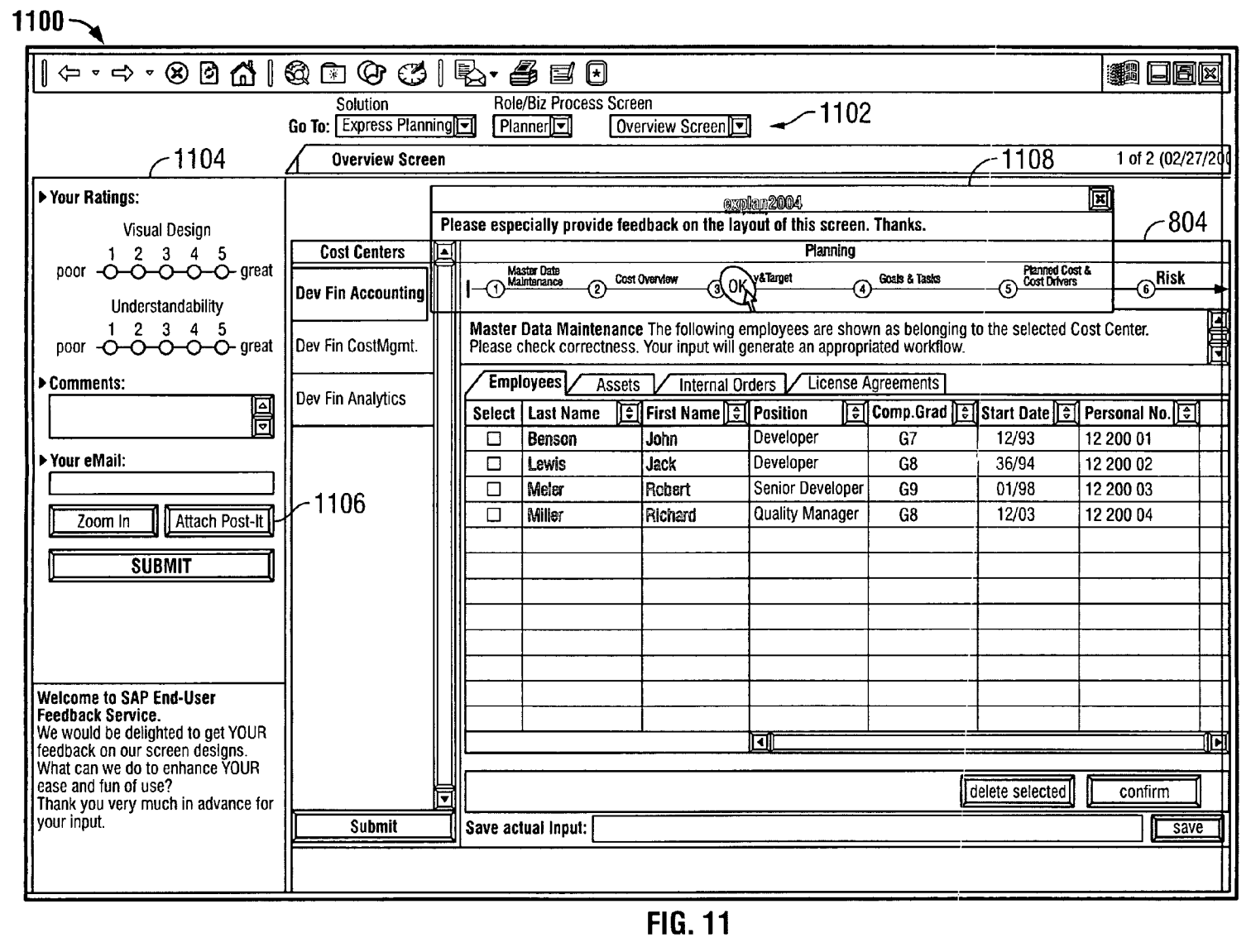

In FIG. 11, a screen 1100 represents a view of a receiving user who has been invited to participate in the campaign, e.g., the user B 134 of FIG. 1. The screen 1100 shows the screen 804, and identifies the relevant campaign in a section 1102. A section 1104 corresponds to the feedback section 140 of FIG. 1, and includes space for ratings/rankings from the receiving user, comments from the receiving user, or tools for the receiving user including the ability to zoom in on a section portion of the screen 804.

The section 1104 also includes a button 1106 allowing the receiving user to create a virtual note for attaching comments to the screen 804, as shown in more detail below. Finally in FIG. 11, a window 1108 provides the comments or introductory text previously entered by the campaign manager 108 (e.g., see section 812 of FIG. 8), which the receiving user may dispose of, or respond to, by pressing an "ok" button, or by other conventional techniques).

Figure 12:
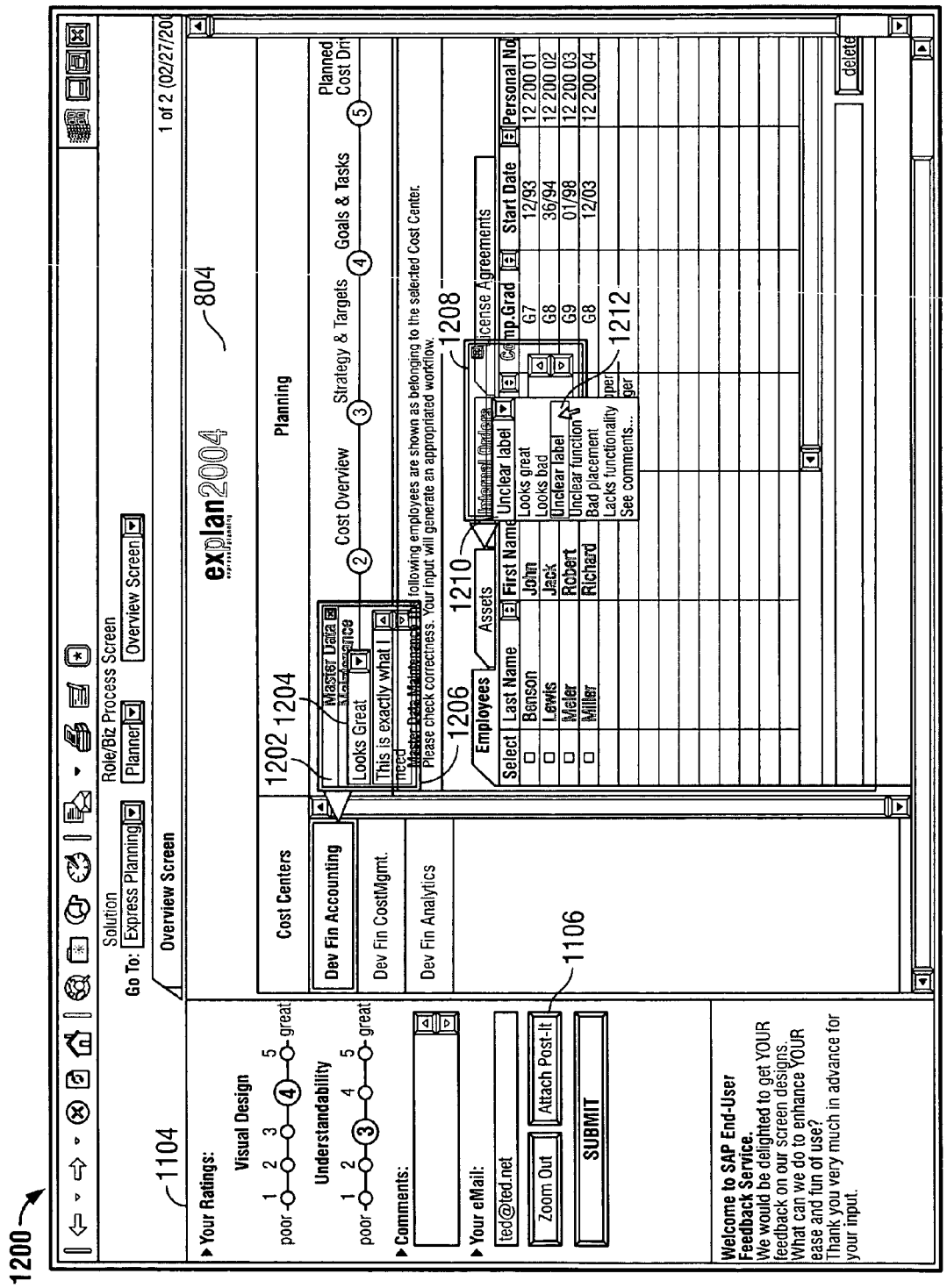

In FIG. 12, a screen 1200 shows a similar view as screen 1100, but for the screen 904. In FIG. 12, the receiving user has attached a first virtual note 1202, which includes a drop-down menu 1204 and a comments section 1206. The receiving user also has attached a second virtual note 1208, which also includes a drop-down menu 1210 and a comments section 1212. It should be understood from the above, and from FIG. 12, that the notes 1202 and 1208 may be placed anywhere on the screen 904 that is desired by the receiving user, so that the user may easily provide specific comments on particular sections of the screen 904.

Moreover, the virtual notes 1202 and 1208 allow the campaign manager 108 to view and aggregate results across a number of screens and/or users. For example, if the screen 904 is sent to a large number of users for feedback, the campaign manager 108 may be able to view that the label identified by the note 1208 received negative feedback from a certain percentage of the users (e.g., a number of notes were posted to that area, with a negative option selected from the drop-down menu 1210). Such information could be shown visually; for example, the campaign manager 108 may see green dots for positive comments, and red dots for negative comments, where the dots are placed on the screen 904 in association with notes placed by receiving users.

Figure 13:
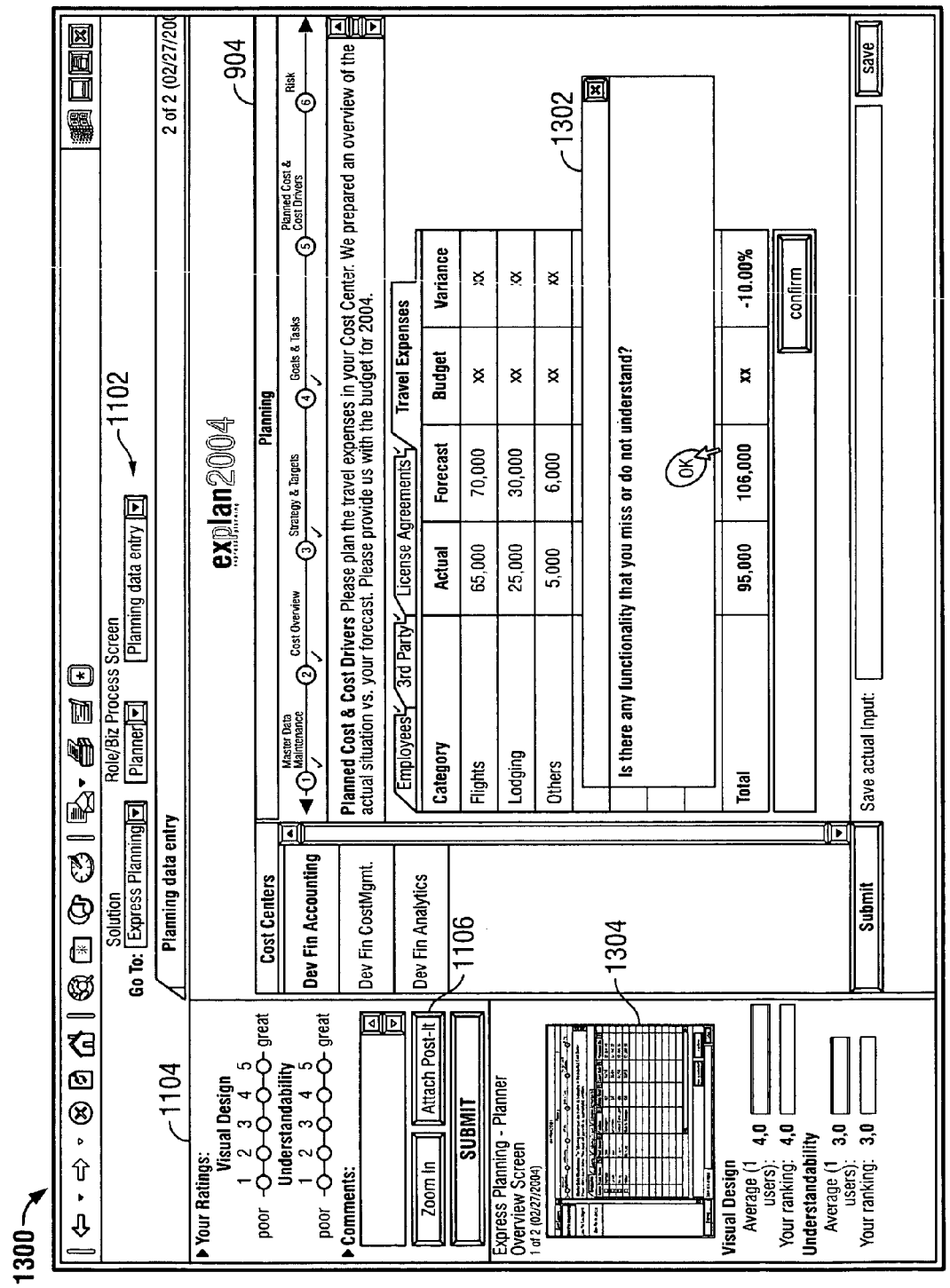

FIG. 13 shows a screenshot 1300 a view of a receiving user providing feedback on the screen 904. As in FIG. 11, the user is shown a window 1302 of introductory text. In FIG. 13, the receiving user also is shown, within the feedback section 1104, instant feedback regarding an average rating of the (previously-viewed and ranked) screen 804, as compiled from other users' feedback.

Figure 14:
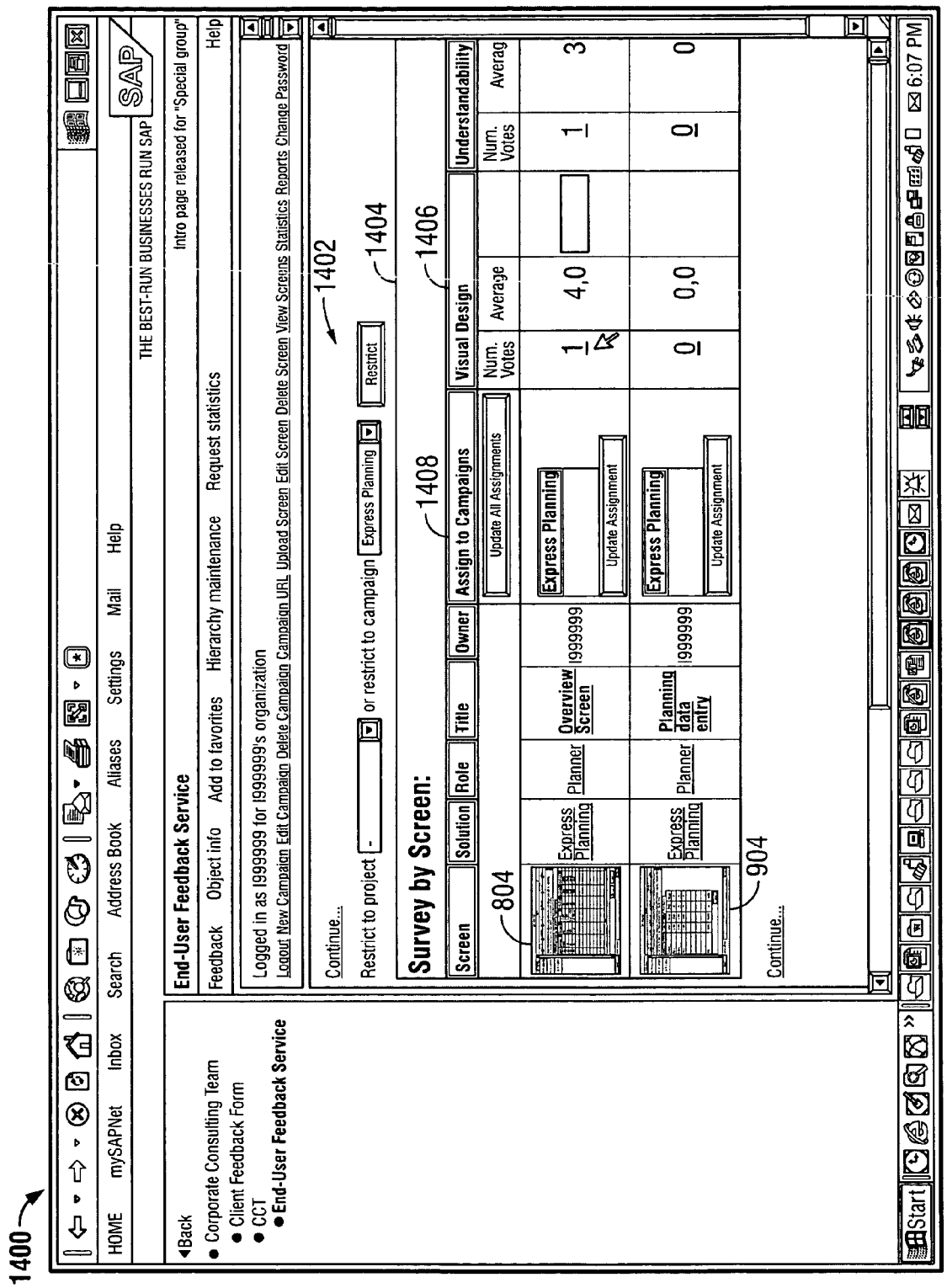
Figure 15:
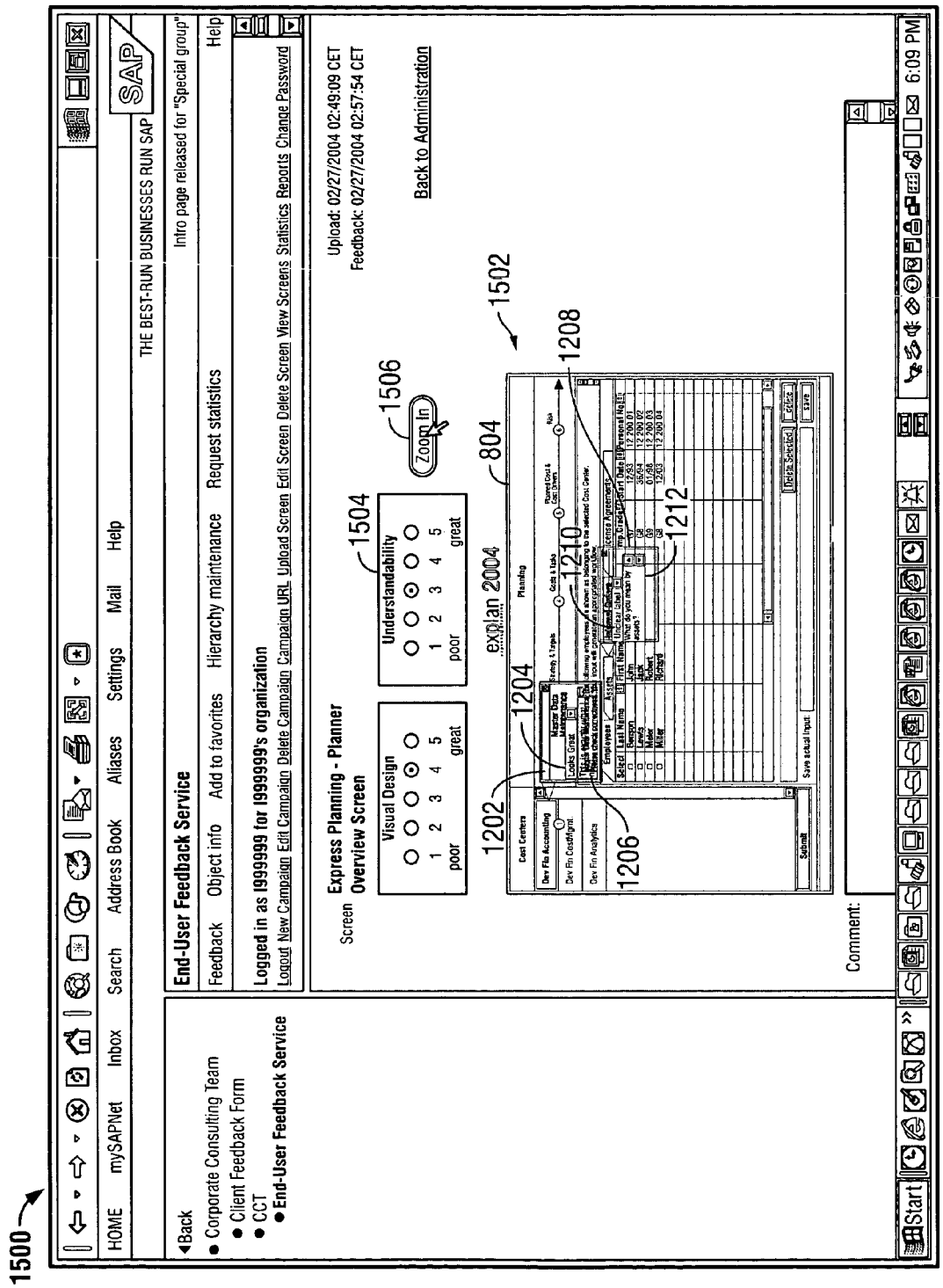
Figure 16:
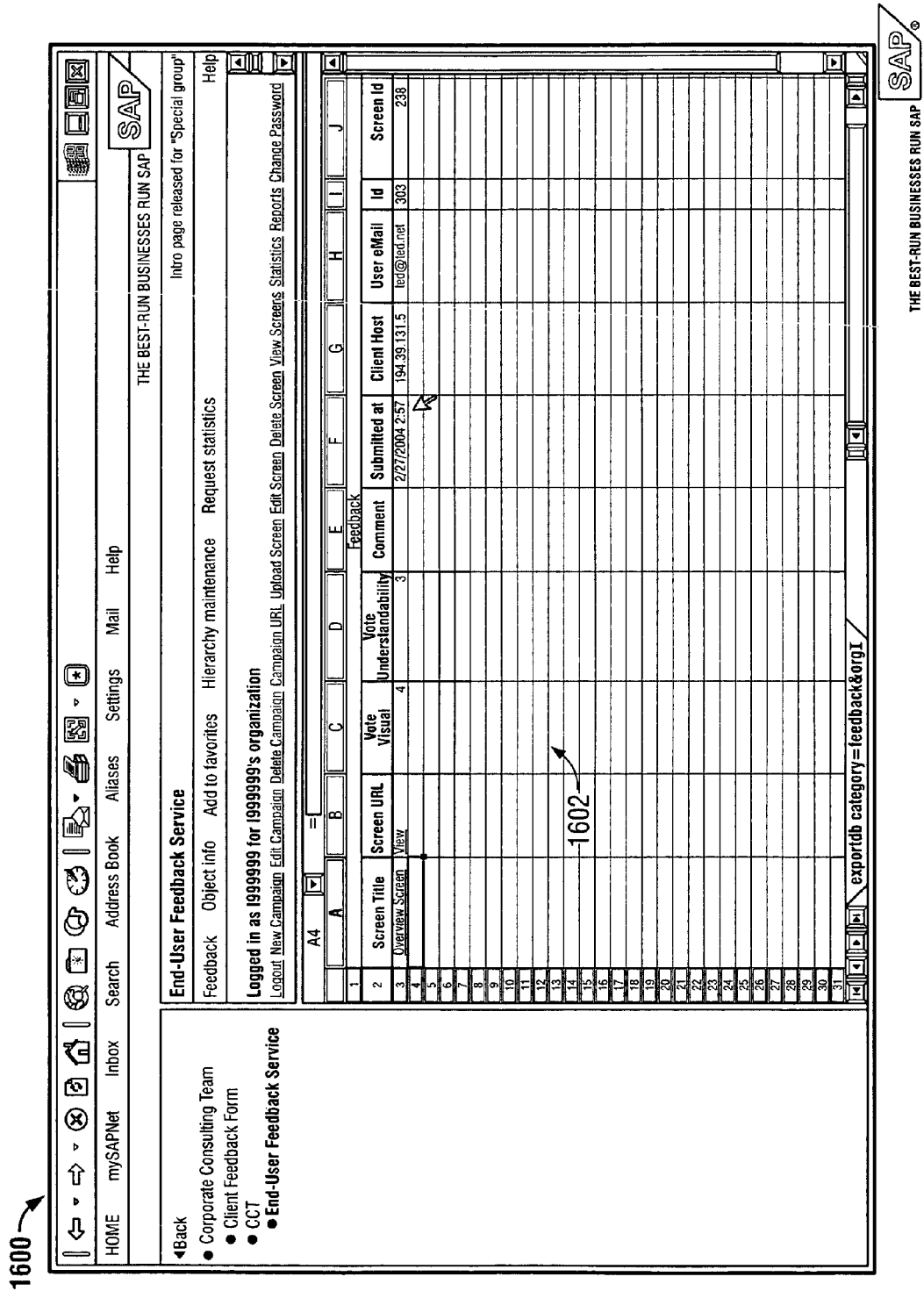

FIGS. 14-16 show screens 1400, 1500, and 1600, respectively, for allowing the campaign manager 108 to view results from the feedback campaign. In FIG. 14, a section 1402 identifies, and allows the campaign manager 108 to select, the relevant campaign, while a section 1404 provides information about the screens 804, 904, including identifying information about the screens 804, 904 and results of feedback regarding the screens 804, 904. For example, a section 1406 provides average rankings regarding the screens 804, 904, while a section 1408 allows the campaign manager 108 to associate one or both of the screens 804, 904 with additional campaigns.

In FIG. 15, a section 1502 allows the campaign manager 108 to view the screen 804 (i.e., a selected one of the screens from the screen 1400) as it was modified by a particular receiving user. A section 1504 shows ranking information provided by the user, while a button 1506 allows the campaign manager 108 to zoom in on a selected portion of the screen 804.

In FIG. 16, the campaign manager 108 is allowed to view feedback information without a thumbnail or other image of the relevant screen(s). Specifically, a section 1602 illustrates various information about a rated screen and the user who provided the information at hand.

Figure 17:
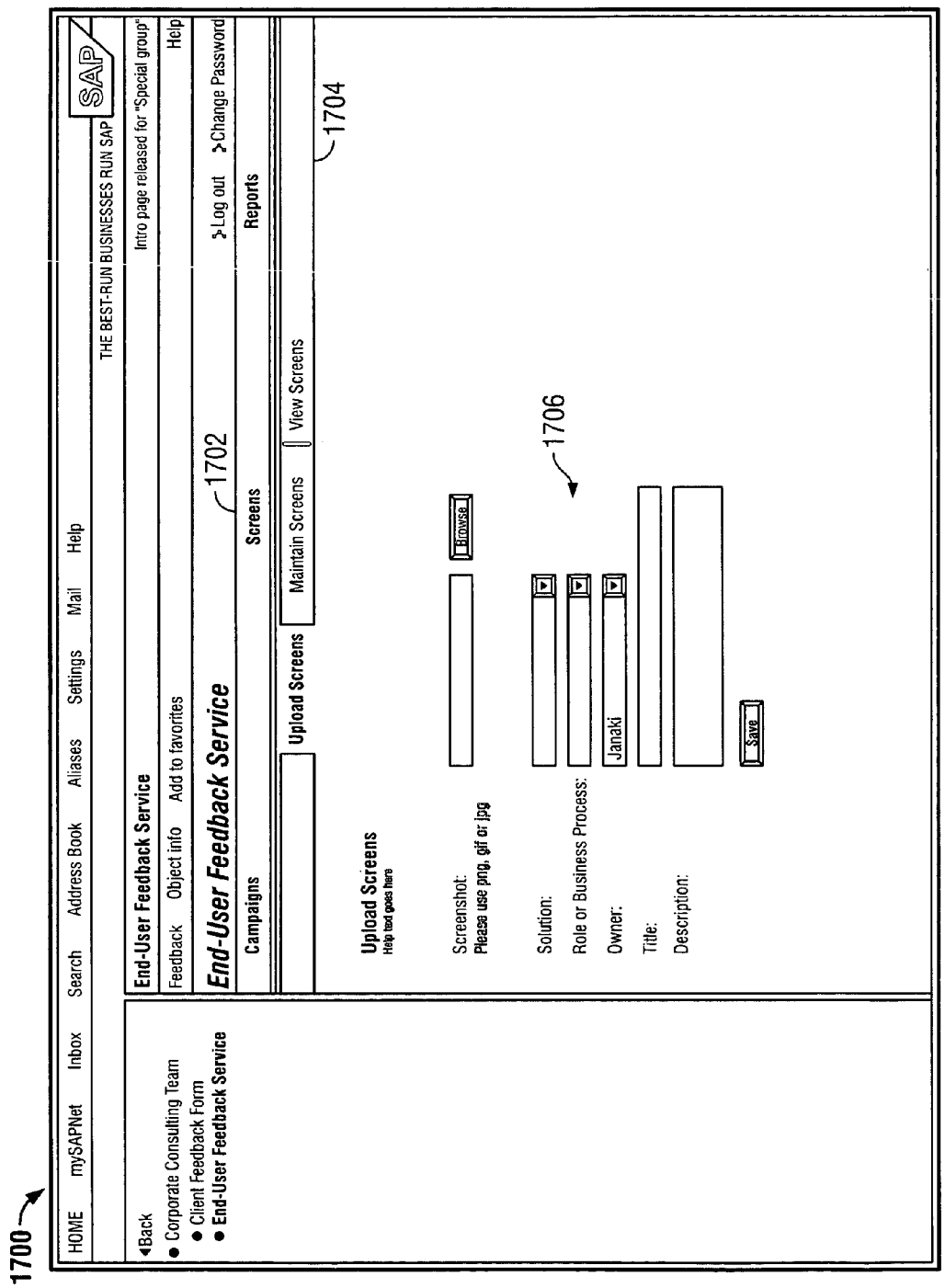

FIGS. 17-21 are screenshots of a second implementation of the system of FIG. 1. In FIG. 17, a screen 1700 represents a screen for managing a campaign. A bar 1702 allows the campaign manager 108 to select a particular campaign(s), screen(s), or report(s), while a secondary bar 1704 illustrates sub-headings for a selected one of these categories.

The bar 1704 illustrates the options of uploading screens, maintaining screens, or viewing screens. As the option of uploading a screen is selected in the screen 1700, a section 1706 correspondingly displays information for uploading a screen, including a source file of the screen and descriptive information regarding the screen.

Figure 18:
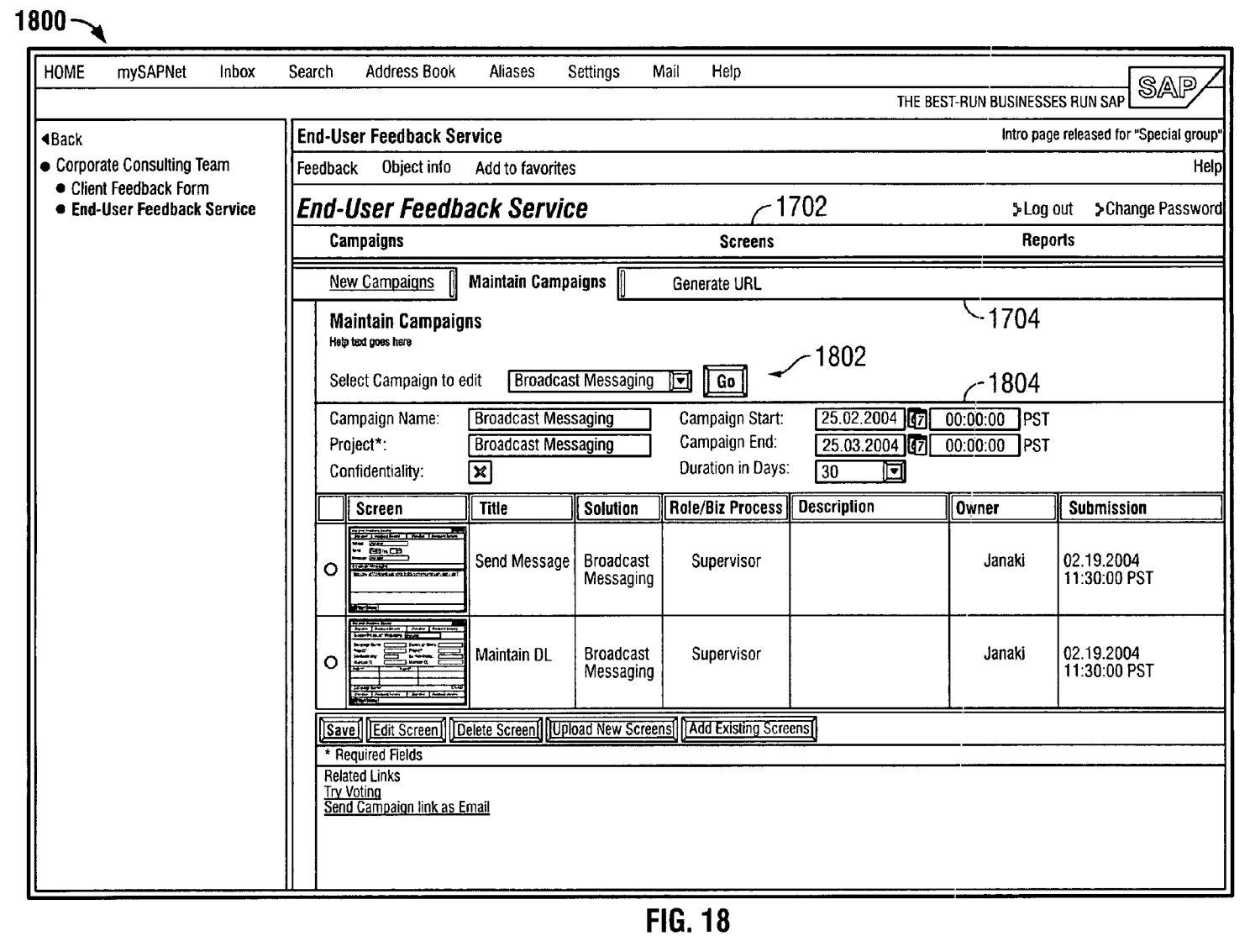

In FIG. 18, a screen 1800 illustrates a situation in which the 'maintain campaigns' option has been selected from the bar 1704. As a result, a section 1802 allows the campaign manager 108 to select a campaign called "Broadcast Messaging" for editing. A section 1804 provides information about this campaign, including thumbnail images of the screens within the campaign, and options for modifying these screens or their characteristics.

Figure 19:
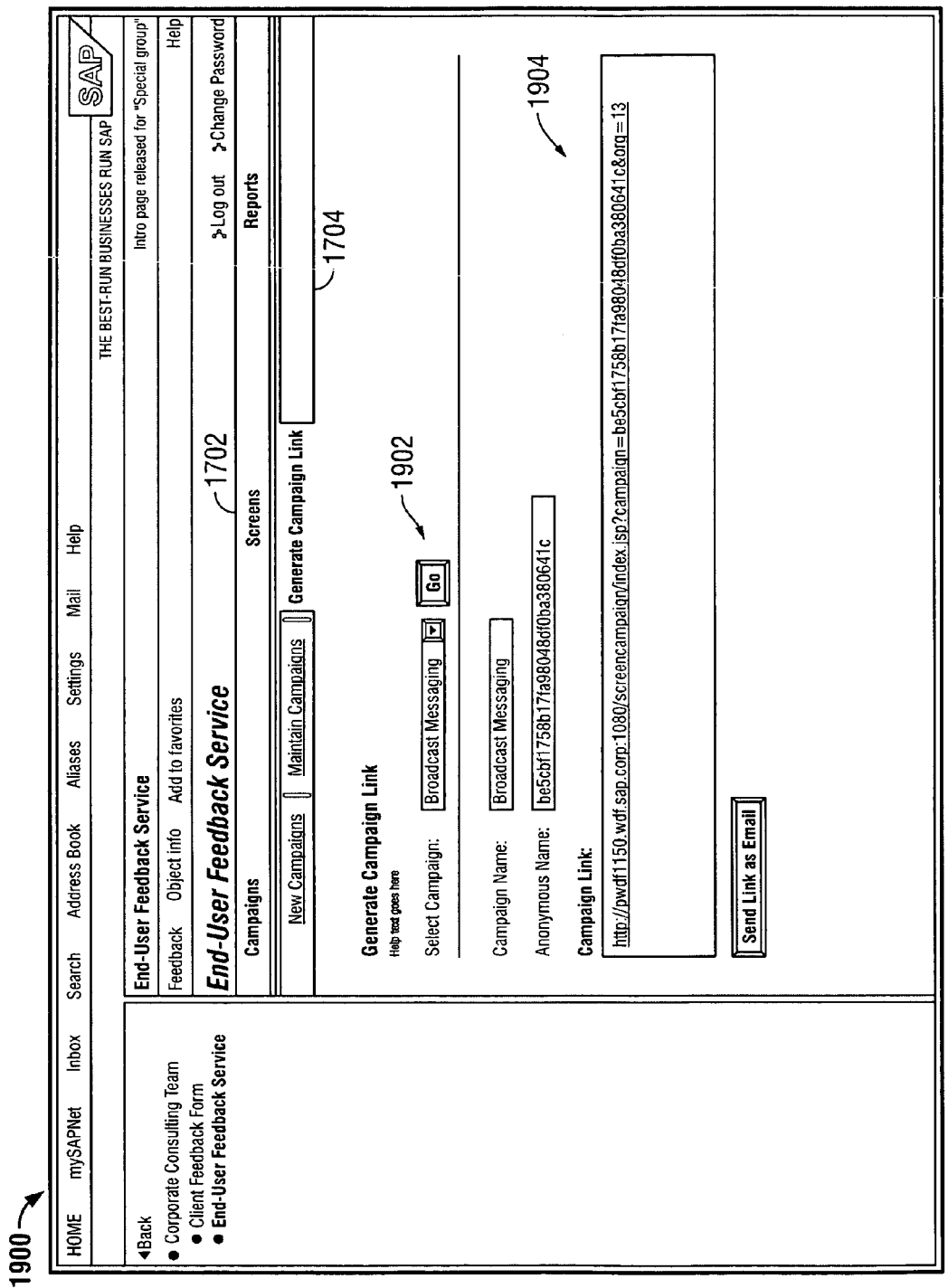

FIG. 19 is a screenshot 1900 illustrating a situation in which the 'generate campaign links' option has been selected from the bar 1704. As a result, a section 1902, similar to the section 1802, allows the campaign manager 108 to select the "Broadcast Messaging" campaign for generating a campaign link. Accordingly, a section 1904 illustrates a link to the campaign to be sent as part of an email to receiving users. It should be understood that the campaign manager 108 may include additional comments to the generated email. Also, either or both of the campaign manager 108 and the receiving user(s) may be anonymous in their participation in the campaign.

Figure 20:
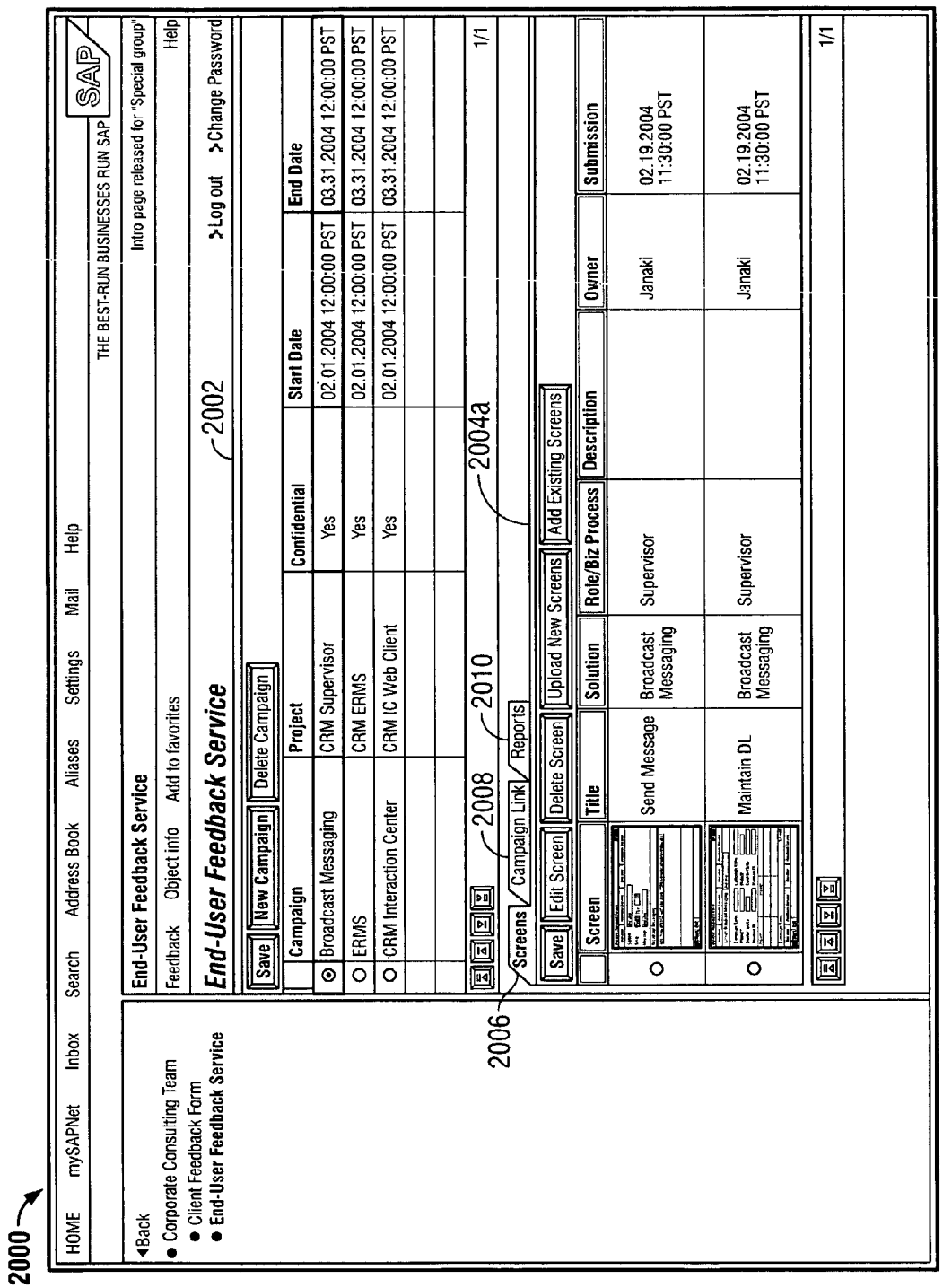
Figure 21:
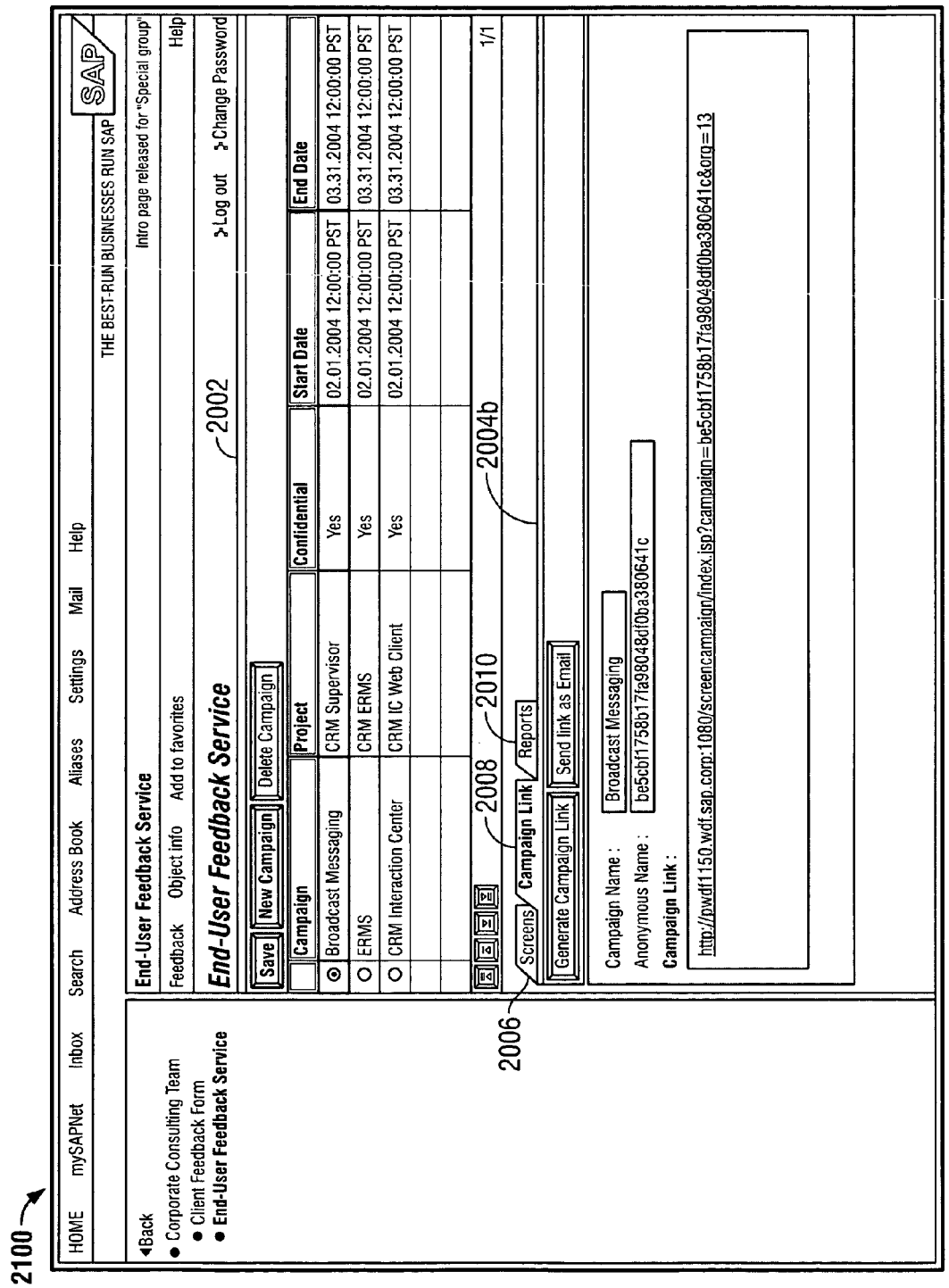

FIGS. 20 and 21 are screenshots 2000 and 2100 for displaying slightly modified campaign management tool(s). In FIG. 20, the campaign manager 108 is provided an overview of current campaigns in a section 2002, and selects the "Broadcast Messaging" campaign. Accordingly, the campaign manager 108 views the screens included in that campaign, along with descriptive information, in a section 2004*a*. That is, in FIG. 20, the campaign manager 108 selects a 'screens' tab 2006 in the section 2004 for viewing the specific screen information. In FIG. 21, the campaign manager 108 selects a 'campaign link' tab 1908 for generating and sending a link to a URL for the relevant campaign. Additionally, a 'reports' tab 2010 allows the campaign manager 108 to view a screen (not shown) for viewing results of feedback received regarding the "Broadcast Messaging" campaign.

Based on the above, it should be understood that the feedback system 102 provides a method for rapidly gathering and leveraging end-user feedback on visual content, in order to improve business software and business processes. Moreover, the end-users are empowered to use the feedback system 102 as they see fit, and may thus share in the benefits of both acquiring and providing valuable feedback on virtually any type of visual content.

Figure 22:
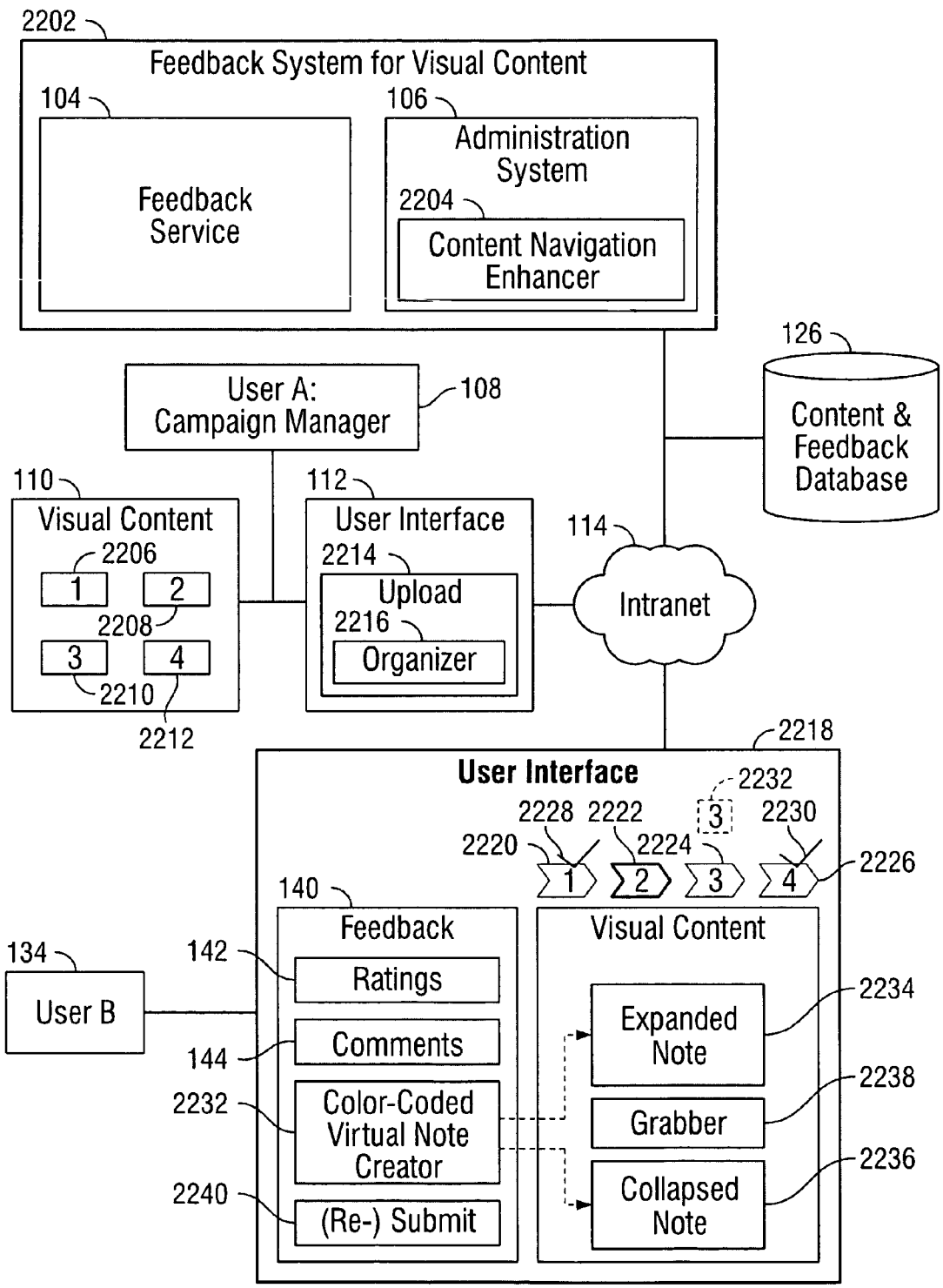
FIG. 22 is a block diagram of a feedback system for visual content having enhanced navigation and feedback features.

FIG. 22 is a block diagram of a feedback system 2202 for visual content having enhanced navigation and feedback features. In FIG. 22, the system 2202 may share many of the features of the system 102 of FIG. 1, including a version of the feedback service 104 and some or all of its associated components, as well as a version of the administration system 106. For clarity, and because they are discussed in detail above, many of these features are not explicitly illustrated or discussed with respect to FIG. 22.

Thus, the system 2202 operates similarly in many respects to the system 102. For example, the campaign manager 108 may upload the visual content 110 to the feedback system 2202, using the user interface 112, as generally described above, so that the feedback system 2202 may provide the visual content 110 to the user 134. In this way, and as described above, the user 134 may provide feedback regarding the visual content 110, and the campaign manager may obtain specific and useful information regarding the visual content 110. It should be understood that certain features or aspects of the system 102 are not illustrated in FIG. 22, such as, for example, the network 132 and the firewall 130, but that these and other components may be used with the system 2202.

Further in FIG. 22, a content navigation enhancer 2204 is illustrated that is designed to provide additional feedback options and control to the user 134. More specifically, for example, the content navigation enhancer 2204 may be used when the visual content 110 includes a plurality of pieces or types of visual content, and particularly when these pieces or types of visual content are related to one another.

For example, as shown in FIG. 22, the visual content 110 may include a plurality of pieces of visual content, including visual content 2206, visual content 2208, visual content 2210, and visual content 2212. In this case, the visual content 2206, 2208, 2210, and 2212 may represent, for example, a specific business process, workflow, or other progression of displays that may be desired by the campaign manager 108.

An example of a business process may include a sequence of screens that a sales professional would encounter when entering an order for a customer. A workflow may include screens corresponding to specific steps involved with an automation of a business process, in which tasks are passed from one participant to another toward the completion of a goal. An example of visual content used for implementing a workflow, therefore, may include screens used by a human resources manager(s) when processing a new hire, or screens used by customer service personnel in responding to customer requests, or various other types of workflow. As yet another example of related pieces of visual content, a marketing team may develop a series of advertisements that build upon one another to deliver a desired message or develop a desired theme.

In such examples of related pieces of visual content, and many other examples, the campaign manager 108 may desire that the visual content 2206, 2208, 2210, and 2212 be considered as a whole, and/or that individual ones of the pieces of visual content 2206, 2208, 2210, and 2212 be considered in relation to one or more of the other pieces of the visual content 2206, 2208, 2210, and 2212. For example, the campaign manager 108 may wish to know whether visual content that occurs later in a sequence is clear and meaningful in light of visual content that occurs earlier in the sequence. In this case, the user 134 may not be able to make a meaningful judgment until both the earlier and later visual content have been viewed.

Somewhat similarly, the user 134 may determine, while reviewing a latter part of a visual content sequence, that he or she has misunderstood the function or content of an earlier part of the sequence. In this case, the user 134 may wish to return to the earlier part of the sequence, in order to determine, and comment on, the part of the sequence that was problematic.

In order to express relationships between, or sequences of, the visual content 2206, 2208, 2210, and 2212, the campaign manager 108 may use an upload functionality 2214 that includes an organizer 2216. For example, the organizer 2216 may enable the campaign manager 108 to establish an order for the visual content 2206, 2208, 2210, and 2212, for presenting to the user 134. As a further example, the organizer 2216 may allow the campaign manager 108 to specify a first order for the visual content 2206, 2208, 2210, and 2212 with respect to a first target audience, and a different order for a second target audience. Somewhat similarly, the organizer 2216 may allow the campaign manager 108 to specify subsets of the visual content 2206, 2208, 2210, and 2212 that are to be sent to specific target audiences.

Thus, when the content navigation enhancer 2204 receives the visual content 2206, 2208, 2210, and 2212 from the user interface 112, the content navigation enhancer has information regarding the desired sequence for the visual content 2206, 2208, 2210, and 2212. In some implementations, if no sequence is specified, then the content navigation enhancer 2204 may default to the assumption that the received order corresponds to a desired order.

Using this information and/or assumption, the content navigation enhancer 2204 may operate on the visual content 2206, 2208, 2210, and 2212 to provide the user 134 with a user interface 2218. The user interface 2218 is similar to the user interface 138 discussed with respect to FIG. 1, but includes features provided by the content navigation enhancer 2204, as well as other features, as discussed in detail below.

In particular, the user interface 2218 includes identifiers 2220, 2222, 2224, and 2226, which correspond to the visual content 2206, 2208, 2210, and 2212, respectively. That is, for example, the identifier 2222 corresponds to the visual content 2208, so that, in FIG. 22, the identifier 2222 is highlighted, because the visual content 2208 is currently displayed within the user interface 2218. By selecting any one of the identifiers 2220, 2224, or 2226, the user 134 may immediately view corresponding visual content 2206, 2210, or 2212, respectively. It should be understood that the identifiers 2220, 2222, 2224, and 2226, displayed in FIG. 22 as enumerated arrows, may be displayed using any conventional technique or component for representing an element of a user interface, such as, for example, a button, a symbol, an icon, a picture, or any other type of shape, character, or figure that may be used in constructing a user interface.

In this way, for example, and as referred to above, the user 134 may progressively move through a sequence of the visual content 2206, 2208, 2210, and 2212, by sequentially selecting corresponding identifiers 2220, 2222, 2224, and 2226, respectively. In one implementation, each of the identifiers 2220, 2222, 2224, and 2226 may provide a link to its corresponding piece of visual content within the content and feedback database 126. In another implementation, the visual content 2206, 2208, 2210, and 2212 may be temporarily stored or cached locally to the user 134, so that the user 134 may toggle back and forth between selected ones of the visual content 2206, 2208, 2210, and 2212 without having to request content from the feedback system 2202 itself.

Thus, for example, the user 134 may effectively have access to an overview of all of the visual content 2206, 2208, 2210, and 2212, and may be informed as to a desired order of review thereof. Accordingly, the user 134 need not actually review (or provide feedback on) the visual content 2206, 2208, 2210, and 2212 in the order specified, but may review some or all of the visual content 2206, 2208, 2210, and 2212 before providing feedback.

For example, the user 134 may first review and provide feedback on the visual content 2206 (associated with the identifier 2220), and may then jump directly to the visual content 2212 (associated with the identifier 2226) to review and provide feedback, before arriving at the view of visual content 2208 shown in FIG. 22. In FIG. 22, the fact that the user has already reviewed the visual content 2206 and 2212 is indicated by check marks 2228 and 2230 next to corresponding identifiers 2220 and 2226. In this way, the user 134 may easily keep track of his or her progress in providing feedback, and have an accurate and real-time update as to how much additional feedback is required. As a result, the user 134 may immediately be aware of a completion of the feedback process, since, in that case, all of the identifiers 2220, 2222, 2224, and 2226 may be checked as having been completed.

Some feedback campaigns may feature a relatively large number of screens of visual content, e.g., twenty, thirty, or more, screens of visual content. If identifiers in such instances were maintained at the same relative size as the identifiers 2220, 2222, 2224, and 2226 in FIG. 22, then, in some implementations, the user 134 may need to perform horizontal scrolling within the user interface 2218, in order to select or view a particular identifier. In other implementations, in order to further facilitate navigation by the user 134, the visual content identifiers may be scaled (e.g., horizontally scaled, by limiting a width of each identifier with respect to a visible width of the user interface 2218), within the user interface 2218, such that all of the identifiers are constantly visible within the user interface 2218. In this way, the user 134 may avoid the need to scroll through the user interface 2218, in order to select or view visual content.

As a further aid to the user 134, a thumbnail picture 2232 may be provided in association with the visual content 2210 and its associated identifier 2224. For example, as the user 134 views the visual content 2208, the user 134 may wish to know information about the visual content 2210. To view the visual content 2210, and as just described, the user 134 may select the identifier 2224 and view the visual content 2210 in its entirety.

However, the user 134 may not immediately remember which of the identifiers 2220, 2224, or 2226 corresponds to the visual content 2210, and may have to toggle through all of the visual content 2206, 2210, and 2212 to locate the desired visual content. Or, even if the user 134 knows that the identifier 2224 corresponds to the visual content 2210, the user 134 may not wish to navigate to the visual content 2210 in its entirety. Rather, for example, the user 134 may simply wish to know general information about the visual content 2210, so as to, for example, refer to the visual content 2210 within the context of feedback provided with respect to the visual content 2208.

In these and other scenarios, the user 134 may view or locate a particular piece of visual content simply by hovering over a selected one of the identifiers 2220, 2224, or 2226, and may thereby activate a corresponding thumbnail picture, such as the thumbnail picture 2232. The thumbnail picture 2232 may include, for example, general information about the visual content 2210, such as its title or subject matter, or the campaign(s) of which it is a part. Alternatively, or additionally, the thumbnail picture also may include some or all of an actual representation of the visual content 2210.

Based on the above, it should be apparent that the user 134 may easily view and provide feedback on a plurality of pieces of visual content. In providing the feedback on any particular visual content, the user 134 may make use of some or all of the various feedback techniques described above with respect to FIGS. 1-21. For example, the user 134 may provide numerical ratings in the section 142, and/or may provide comments in the section 144.

As also described above, the user 134 may provide comments on specific portions of visual content by using virtual notes. In the implementation of FIG. 22, a color-coded virtual note creator 2232 is provided that generates virtual notes according to a pre-defined coloring scheme. For example, the user 134 may select red virtual notes to provide negative or critical comments, white virtual notes to provide neutral comments, and green virtual notes to provide positive comments or praise. In this way, the campaign manager 108, upon reviewing results of a particular feedback campaign, may easily obtain information regarding a general tone of the feedback, e.g., whether the feedback is positive, neutral, or negative, without reading any associated comments in detail.

In FIG. 22, an expanded virtual note 2234 is one that has been expanded by the user 134 to enter or view comments contained therein, whereas a collapsed virtual note 2236 represents a virtual note that has been reduced in size to minimize its impact on a viewing area of the visual content 2208. For example, the user 134 may have previously placed the virtual note 2236, provided feedback therein (e.g., selected a rating and/or added comments to an associated comment box), and then closed or minimized the virtual note 2236. At any time later, the user 134 may re-expand the virtual note 2236, in order to view its contents. Similarly, the virtual note 2234 may currently be expanded because the user 134 is viewing or modifying the contents thereof.

An additional tool for providing feedback regarding the visual content 2208 is a grabber tool 2238. The grabber tool 2238 refers to a tool for identifying or "grabbing" a particular portion of the visual content 2208, and for moving the particular portion so as to provide an improved view of the portion, or adjacent portions, to the user 134. For example, if the user 134 is reviewing the visual content on a small screen (e.g., the screen of a mobile computing device), the user 134 may not be able to view the visual content 2208 in its entirety, but may not wish to reduce a viewing size of the visual content 2208, and/or may not wish to change a display resolution of the mobile computing device. In this case, the user 134 may use the grabber tool 2238 to selectively view desired portions of the visual content 2208, in the size and resolution desired by the user 134 and/or the campaign manager 108.

Finally in FIG. 22, a submit/re-submit button 2240 is illustrated, which may be used by the user 134 to submit feedback, or to submit revised feedback. For example, in FIG. 22, and as explained above, the user 134 has already provided feedback with respect to the visual content 2206 and the visual content 2212 (as indicated by the check marks 2228 and 2230, respectively), and is currently viewing the visual content 2208.

After the user 134 is finished providing feedback regarding the visual content 2208, the user may select the submit button 2240, in order to indicate this completion of feedback. At this point, the feedback for the visual content 2208 is collected at the system 2202 and stored in the database 126, the content navigation enhancer 2204 may then provide a check mark next to the identifier 2222, and the submit button 2240 may be re-labeled with the name "re-submit."

In some implementations, it may not be necessary for the user 134 to select the (re)submit button 2240. For example, if the user 134 submits feedback regarding the visual content 2208, and then selects the identifier 2224 to view the visual content 2210, then the user 134 may forget to select the submit button 2240 before moving on. In such cases, the feedback regarding the visual content 2208 may automatically be submitted (and the submit button 2240 re-labeled as "re-submit"), by virtue of the user 134 navigating to the different screen, without the user 134 having selected the submit button 2240.

In any of these scenarios, it may occur that the user 134 decides to return to the visual content 2206 (by selecting the identifier 2220), in order, for example, to modify whatever feedback was previously submitted. In such cases, the user 134 may simply, and then click the re-submit button 2240. In this way, the user 134 may modify previously-submitted feedback, which may occur, for example, when the user 134 changes his or her mind about an earlier piece of visual content, after viewing a piece of visual content that is later in a sequence.

Although the content navigation enhancer 2204 is discussed above in the context of related visual content, it should be understood that the content navigation enhancer 2204 may be used even when the visual content 2206, 2208, 2210, and 2212 does not represent any particular sequence or flow of information. For example, even if the visual content 2206, 2208, 2210, and 2212 represents four unrelated pieces of visual content that have been assembled by the campaign manager 108, the user 134 still may benefit from the various features described above.

In particular, whether the visual content 110 is intra-related or not, the user 134 may benefit from the various features when the visual content 110 includes a relatively large number of individual pieces of visual content. For example, the user 134 may benefit from the ability to quickly locate a desired piece of visual content from among the large number of individual pieces of visual content, using the identifier(s) and/or thumbnail picture(s) described above.

Based on the above, it should be understood that the content navigation enhancer 2204 provides the user 134 with control, flexibility, and convenience when the user 134 is reviewing visual content and providing feedback thereon. By providing identifiers that are associated with respective pieces of visual content within a campaign, the content navigation enhancer provides the user 134 with an ordered overview of the campaign, and allows the user easily to select and/or view particular visual content, and to determine whether feedback for the particular visual content has already been submitted.

Figure 23:
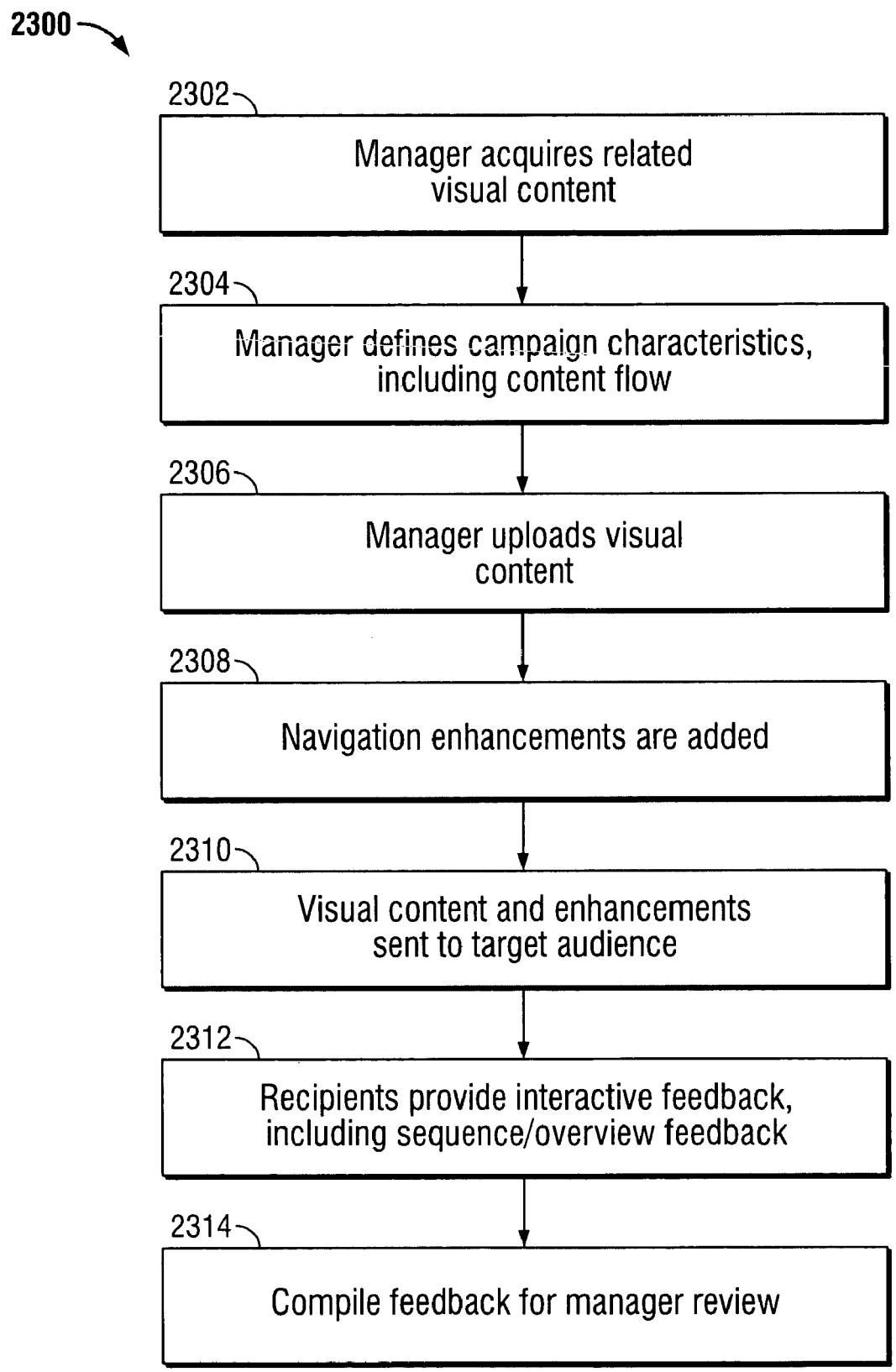
FIG. 23 is a flowchart illustrating a first process for using the system of FIG. 22.

FIG. 23 is a flowchart 2300 illustrating a first process for using the system of FIG. 22. FIG. 23 includes many of the techniques discussed above with respect to FIG. 2, so that some of these techniques and features are not discussed in detail with respect to FIG. 23. For example, it should be understood that the registration process discussed with respect to FIG. 2 is equally applicable with respect to FIG. 23.

In FIG. 23, the campaign manager 108 acquires the visual content 110 (2302), which may include pieces of visual content 2206, 2208, 2210, and 2212, where these pieces of visual content may or may not be related to one another in the context of, for example, a business process or workflow. The campaign manager 108 defines characteristics for the particular campaign, and may use the organizer 2216 to specify a flow or sequence of the pieces of visual content, perhaps with respect to a particular target audience(s) (2304). The campaign manager 108 then uploads the visual content (2306).

The visual content is received at the feedback system 2202, and, in addition to the various processing of the visual content discussed above with respect to FIGS. 1-21, the content navigation enhancer 2204 provides navigation enhancements to the visual content (2308). For example, as should be understood from the above discussion of FIG. 22, the content navigation enhancer 2204 may determine a desired flow or sequence of individual pieces of visual content that have been received, and may associate an identifier with each piece of visual content. In this way, the content navigation enhancer 2204 may provide the identifier for each piece of visual content, in the determined order, within the context of the user interface 2218. As described, each identifier provided by the content navigation enhancer provides a link or pointer to the associated piece of visual content, so that the user 134 may easily locate and view a desired piece of visual content, and/or information about that visual content.

Then, the visual content and navigational enhancements may be sent to a desired target audience (2310), so that the recipients within the target audience may provide feedback regarding the visual content. Since, as described, the identifiers and other navigational enhancements provide easy movement between the pieces of visual content, information regarding an overview or flow of the visual content, and status updates as to a completion state of the review process (among other features), the user 134 and other members of the target audience are provided with an easy and interactive way to provide feedback regarding both individual pieces of visual content, and regarding the sequence of visual content, as a whole (2312). As a result, the feedback system 2202 may compile the provided feedback for review by the campaign manager 108 (2314). In this way, the campaign manager 108 is likely to receive meaningful and concise feedback regarding the visual content within the campaign.

Figure 24:
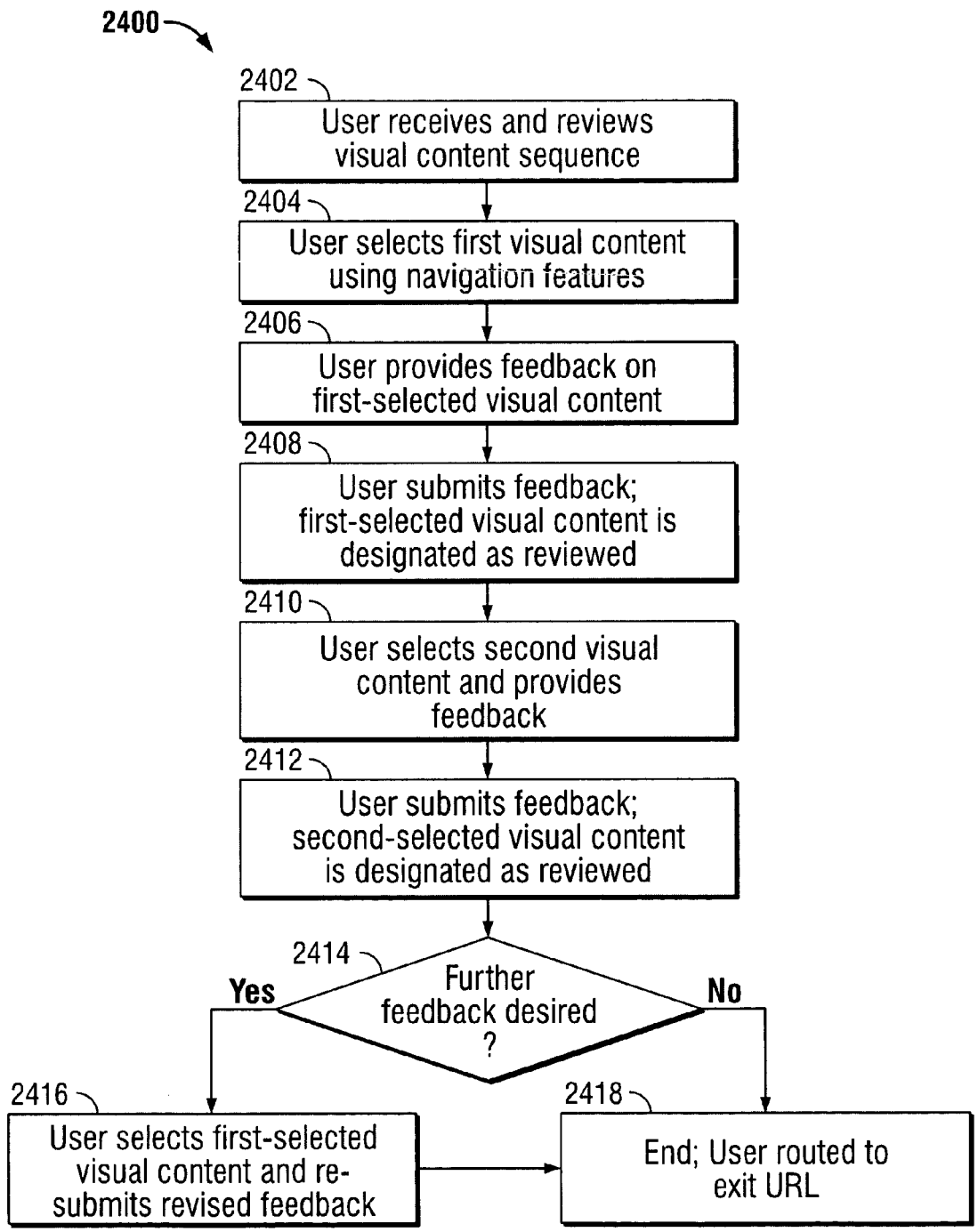
FIG. 24 is a flowchart illustrating a second process for using the system of FIG. 22.

FIG. 24 is a flowchart 2400 illustrating a second process for using the system of FIG. 22. FIG. 24 generally describes the feedback process from a point of view of the user 134. In FIG. 24, the user 134 receives the visual content sequence and reviews the visual content (2402). As explained, the user 134 may easily review all of the visual content, in any desired sequence, before deciding to provide feedback on any particular piece of the visual content. As such, the user 134 is not limited to using "next/back" buttons to move from one piece of visual content to a consecutive piece, which may be particularly disadvantageous when there is a large number of pieces of visual content.

The user 134 may thus select a first piece of visual content, using the navigation features discussed above, and provide feedback regarding this visual content (2406). Then, the user 134 may submit the feedback to the feedback system 2202 by selecting the submit button 2240, whereupon the particular visual content is marked as having been reviewed (2408).

The user 134 may then select a second piece of visual content and provide feedback (2410), and submit the feedback so that the second visual content may be marked as having been reviewed (2412). In an example where, for simplicity's sake, it is assumed that only two sequential pieces of visual content are included in a feedback campaign, then, if the user 134 decides to provide further feedback (2414), the user 134 may return to the first-selected visual content, revise the previously-provided feedback, and re-submit the revised feedback, using the re-submit button 2240. Then, or if no further feedback is to be provided, the feedback process ends and the user 134 may be routed to an exit URL (Uniform Resource Locater) for, for example, a website provided by the feedback system 2202 or previously designated by the user 134 (2418). Of course, if numerous pieces of visual content are included in the campaign, the user 134 may toggle between any and all of them, and submit or re-submit feedback, as often as the user 134 desired, before completing his or her feedback.

Figure 25:
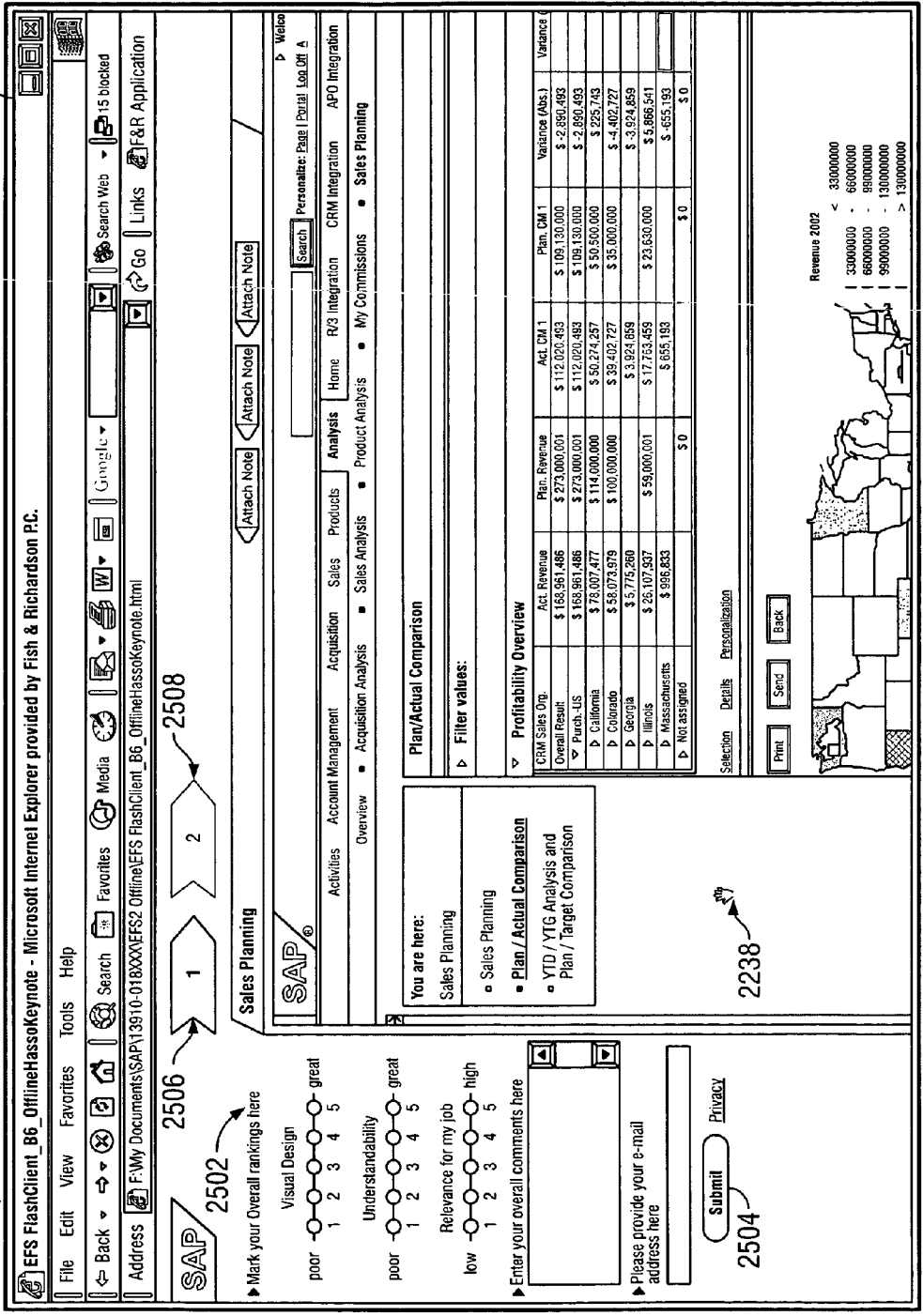
FIGS. 25-28 are screenshots of the system of FIG. 22.

FIGS. 25-28 are screenshots of the system 2202 of FIG. 22. In FIG. 25, a screen shot 2500 shows content that has been received at the user interface 2218 that is to be reviewed by one or more users. A section 2502 corresponds to the feedback section 140 of FIG. 22, and includes space for ratings/rankings from the receiving user, comments from the receiving user, and a submit button 2204.

In this implementation, the user interface 2218 includes arrow shaped navigation buttons 2206, 2208 as the above-discussed identifiers that allow the user 134 to switch between multiple content screens of the particular campaign. While two navigation buttons are shown, it should be understood that each content screen that has been loaded into the user interface is assigned its own navigation button by the content navigation enhancer 2204. Thus, when the user 134 clicks on a particular navigation button, the content screen associated with that navigation button is displayed in the user interface 2218. The navigation buttons 2206, 2208 also include a reference numeral, so that the user is able to quickly determine the total number of content screens available for review. The functions and features of each navigation button are described in greater detail below, in the context of the screenshots of FIGS. 25-28.

FIG. 25 also shows the grabber tool 2238 that allows the user 134 to click and hold on an area of the content screen, while moving the grabber tool 2238 in a chosen direction, which in turn moves the content screen within the user interface. This feature is particularly useful when the size of the content screen is larger that the display area of the user interface. Using the grabber tool 2238, the user 134 is able to easily reposition the content screen so that all of the information forming the content screen can be reviewed. Thus, the campaign manager 108 is able to load content screens that are larger than the display area of the user interface 2218, without the need for reducing the size of the content screen and possibly compromising the resolution of the content screen information.

Figure 26:
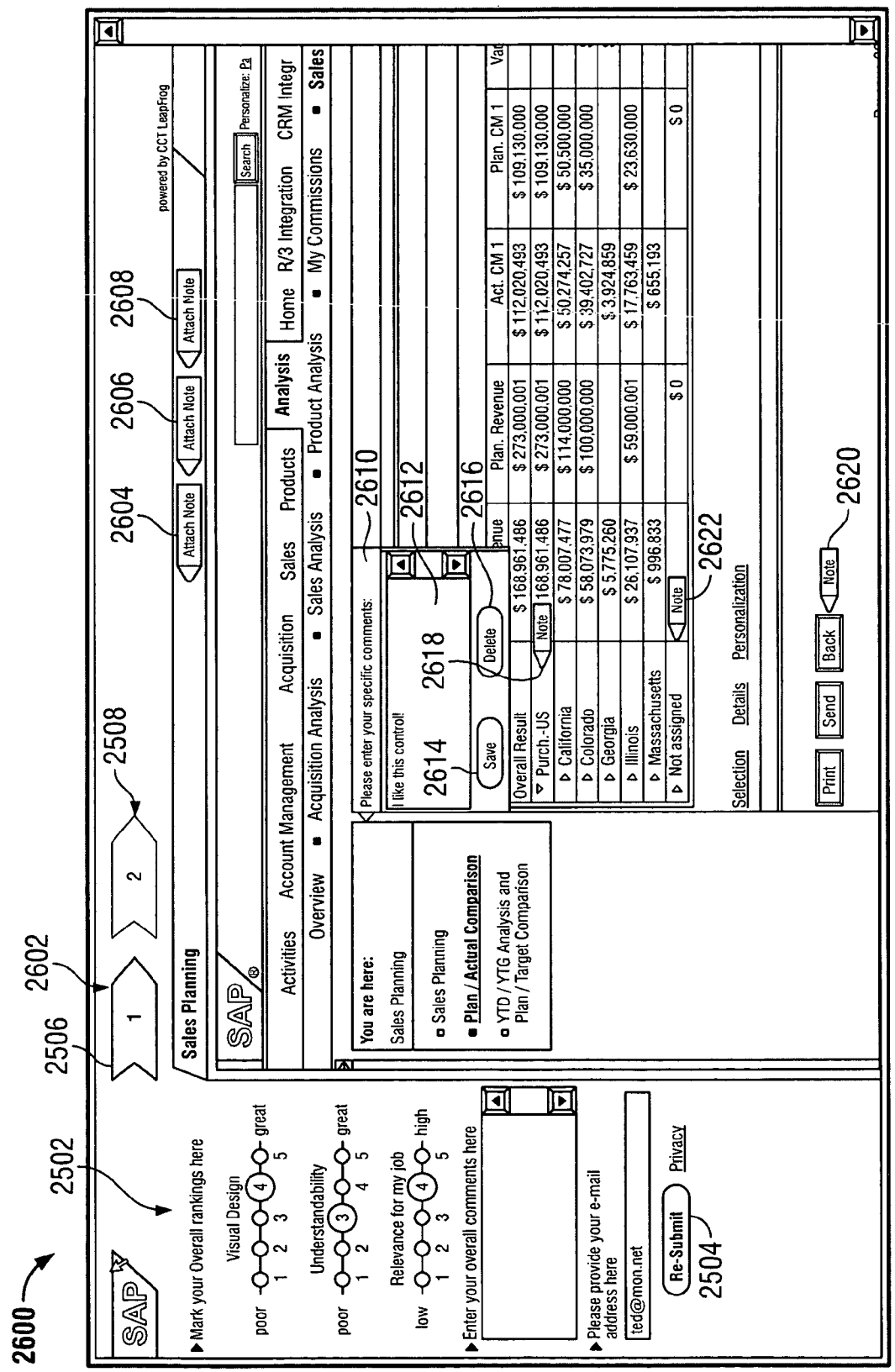

FIG. 26 shows a screen shot 2600 with actual feedback information selected within the section 2502. After the user 134 provides his or her feedback for the content screen currently displayed, the user 134 may click on the submit button 2504 so that the feedback is saved. After clicking the submit button 2504, the next content screen in the sequence is displayed in the user interface for review, and the button appearance is changed to display "Re-Submit." In the event that the user makes changes to their feedback about the content screen, the user may then click on the button 2504 now labeled "Re-Submit" so that the changes are properly saved.

As described above with respect to FIG. 22, a check mark 2602 may be displayed on top of the navigation button 2506 associated with the content screen. Thus, as shown in FIG. 26, navigation button 2506 includes a check mark 2602 indicating that feedback has been submitted and saved for the first content screen. In one implementation, the check mark 2602 is displayed in green. The navigation button 2508 is shown without a check mark 2602, to indicate that the user 134 has not yet submitted feedback for the second content screen.

FIG. 26 also shows three virtual note buttons 2604, 2606, 2608 that allow a user to drag a virtual note onto the content screen. In this implementation, virtual note button 2604 is green and allows the user to drag a green virtual note representing positive feedback onto the content screen; virtual note button 2606 is red and allows the user to drag a red virtual note representing negative feedback onto the content screen; and virtual note button 2608 is white and allows the user to drag a white virtual note representing neutral feedback onto the content screen. It should be understood that other color and feedback indication schemes may be selected and/or associated with other types of virtual notes.

As the user 134 reviews a particular content screen, the user 134 may wish to provide specific feedback about features or information forming the content screen. In the exemplary implementation of FIG. 26, several virtual notes have been placed onto the content screen. More specifically, a virtual note 2610 may be a green virtual note being associated with a text box area of the content screen. The virtual note 2610 is displayed in an expanded mode (corresponding to the virtual note 2234) which allows the user to type text within a comment area 2312 of the virtual note. Once the user 134 types a comment, such as "I like this control!", the user 134 has the option to save or delete the comment by clicking on the appropriate button. If the user clicks on the save button 2614, the comment text is saved, the comment area 2612 of the virtual note 2310 closes, and the virtual note is displayed as a reduced size icon (corresponding to virtual note 2236 of FIG. 22) labeled "Note."

Once the virtual note 2310 is saved, the user 134 is able to expand the virtual note and re-display the comment area 2312 by mousing over a selected, collapsed virtual note. The user 134 again has the option to save or delete the virtual note. A first red virtual note 2618 is shown as being placed onto a field of the content screen, a second red virtual note 2620 is shown as being associate with a "Back" button of the content screen, and a white virtual note 2622 is shown as being placed onto a field of the content screen.

Figure 27:
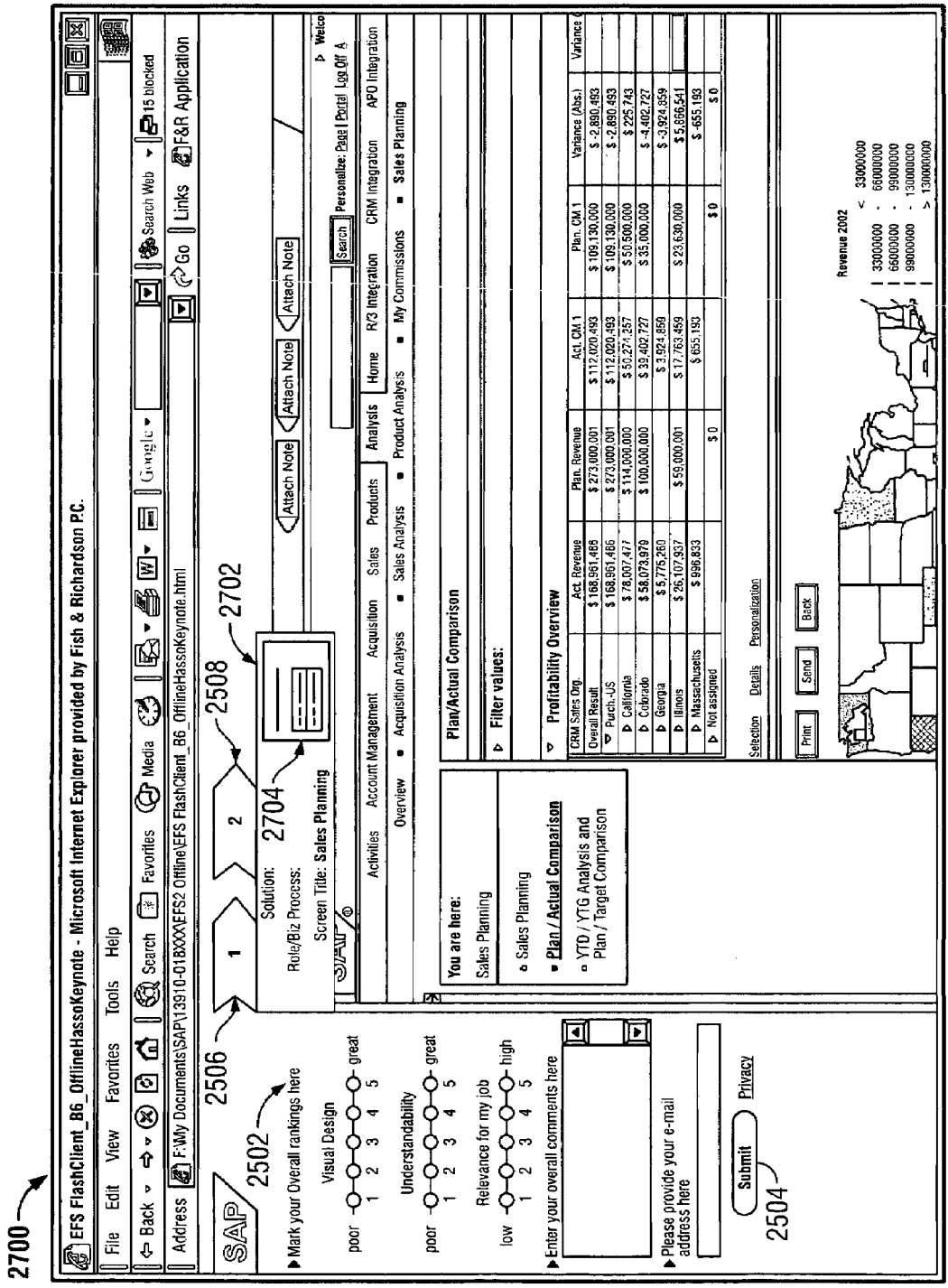

FIG. 27 is a screen shot 2700 that shows another feature of the user interface 2218. More specifically, the navigation button 2506 associated with the first content screen is shown in an expanded mode that displays an information box 2702. The information box 2702 expands from the navigation button 2506 when the user mouses over, or places the mouse cursor on top of, the navigation button 2506. The information box 2702 may display information about the content screen including Solution, Role/Biz Process, and Screen Title. The information box 2702 also may display a thumbnail picture 2704 representing the content screen associated with that navigation button.

Figure 28:
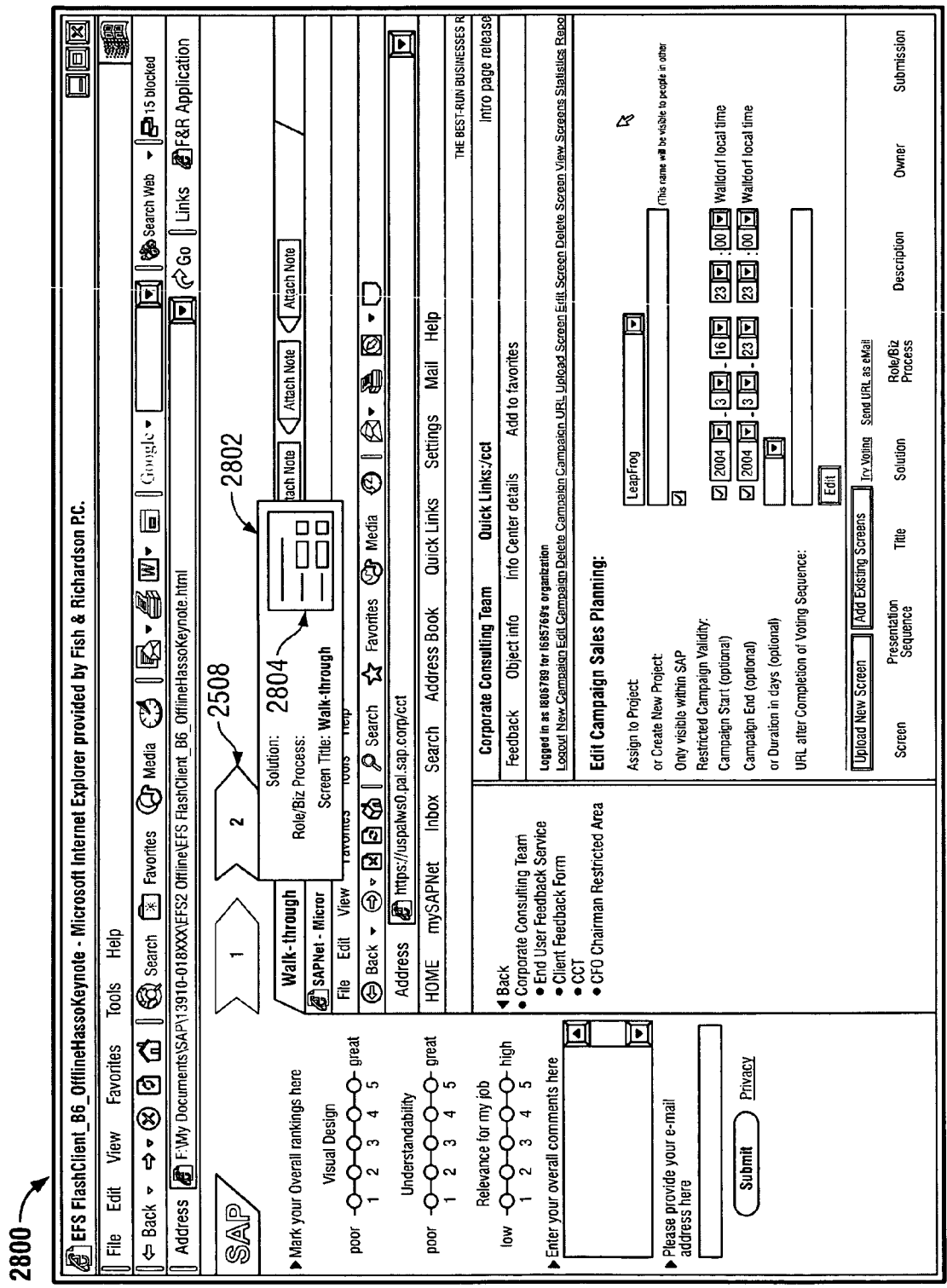

FIG. 28 is a screen shot 2800 that shows an expanded information box 2802 and thumbnail picture 2804 associated with the navigation button 2508. The information box 2802 also expands from the navigation button 2508 when the user mouses over the navigation button 2508.

As an example with reference to FIGS. 27 and 28, when multiple navigation buttons (e.g. navigation buttons 2506, 2508) are present within the user interface 2218, the user 134 is able to easily and quickly determine the information about the various content screens to be reviewed by simply mousing over each navigation button. When the navigation button expands to display its information box, the user 134 is able to view information about that particular content screen. The user 134 may then click on that navigation button to display the full view of the content screen within the user interface, or the user may move the cursor to another navigation button. As will be appreciated, the navigation buttons 2506, 2508 and their associated features provide an enhanced navigation function within the user interface and allow the user to efficiently navigate between content screens during the review and feedback process. Additionally, as discussed in detail above, the navigation and feedback features of the feedback system 2202 provide an enhanced metaphor for obtaining user feedback on business processes, transactions, and other types of processes that execute in a sequence or are otherwise inter-related.

Although the above discussion has been provided with respect to static visual content, it should be understood that video and/or interactive application content also may be used in the context of the feedback systems 102 and 2202. Also, although the content navigation enhancer is shown as a component of the administration system 106, it should be understood that some or all of the functionality of the content navigation enhancer 2204 may be performed within the feedback service 104, the user interface 112 (or otherwise local to the campaign manager 108), and/or within the user interface 2218 (or otherwise local to the user 134). Other modifications and variations also may be implemented.

What is claimed is:

1. A system comprising:
    a feedback system operable to receive a first static visual content screenshot and a second static visual content screenshot from a first user, the first and second static visual content screenshots representing a progression of displays to be viewed in a sequence selected by the first user, and provide the first and second static visual content screenshots to a second user for viewing in the sequence that is selected by the first user together with feedback elements for obtaining feedback from the second user regarding the first and second static visual content screenshots; and
    a content navigation enhancer operable to provide navigation through the sequence of first and second static visual content screenshots, and generate a first link to the first static visual content screenshot that provides the second user access to the first static visual content screenshot and generate a second link to the second static visual content screenshot that provides the second user access to the second static visual content screenshot, the access provided during the obtaining of feedback from the second user;
    wherein the feedback system and content navigation enhancer are operable to generate a graphical user interface (GUI), the GUI comprising:
    (1) a first area in which the first and second static visual content screenshots are presented in the sequence to obtain feedback on the first and second static visual content screenshots from a viewing user,
    (2) a second area including a first link associated with the first static visual content screenshot and a second link associated with the second static visual content screenshot, wherein the first and second links provide navigation through the sequence of first and second static visual content screenshots so that a selected one of the first and second screenshots is displayed in the first area of the GUI, and (3) a third area including feedback elements selectable by the viewing user to provide feedback regarding the screenshots, the feedback elements including;

(a) a rating section that includes a pre-defined question and an associated rating scale, the rating scale operable to receive a rating selected by the viewing user, and (b) a virtual note creator for the viewing user to generate a virtual note for associating user-defined text comments with a location on the static visual content screenshot in the first area of the GUI, the location defined by the viewing user;

a results manager operable to receive feedback information from the second user by way of the feedback elements, the feedback information including:

(i) a rating selected by the viewing user from the rating scale associated with the pre-defined question, and (ii) a user-defined text comment and associated user-specified location from a generation of a virtual note by the viewing user.

2. The system of claim 1 wherein the feedback system and the content navigation enhancer are operable to generate a user interface in which the first link and the second link are simultaneously displayed to the second user while the first static visual content screenshots are presented, such that the second user has access to the second static visual content screenshot through the second link.

3. The system of claim 2 wherein the content navigation enhancer is operable to scale a size of the first and second links within a user interface, such that the first link, the second link, and any other links associated with other static visual content screenshots received from the first user, are constantly visible within the user interface during the display of the first static visual content screenshot.

4. The system of claim 2 wherein the content navigation enhancer is operable to determine a sequential order of the first and second static visual content screenshots, such that the first and second links are generated within a user display so as to represent the sequential order.

5. The system of claim 4 wherein the content navigation enhancer is operable to receive the sequential order from the first user.

6. The system of claim 2 wherein the content navigation enhancer is operable to display the first link with another visual appearance than the second link when the first static visual content screenshot is displayed with the user interface.

7. The system of claim 2 wherein the content navigation enhancer is operable to mark the first link on the user interface in response to a submission of feedback regarding the first static visual content screenshot by the second user.

8. The system of claim 2 wherein the content navigation enhancer is operable to provide information regarding the second static visual content screenshot in response to a selection of the second link by the second user, while the first static visual content screenshot is displayed on the user interface.

9. The system of claim 2 wherein the content navigation enhancer is operable to provide a grabber tool within the user interface that allows the second user to view selected portions of the first static visual content screenshot when the first static visual content screenshot is too large to be entirely displayed within a display of the user interface.

10. The system of claim 1 wherein the feedback system is operable to receive feedback from the second user regarding the first static visual content screenshot, and further operable to receive revised feedback from the second user regarding the first static visual content screenshot, and update the feedback based on the revised feedback.

11. The system of claim 1 further comprising an administration service operable to provide the first and second static visual content screenshots and feedback elements to the second user as part of a feedback campaign that is individually-tracked with respect to the first user, the administration service further operable to provide the first user with results of the feedback campaign.

12. The system of claim 11 wherein the administration service is operable to store the static visual content screenshots and the feedback in association with the feedback campaign and the first user.

13. The system of claim 1 wherein the feedback elements include a virtual note creator, the virtual note creator operable to allow the second user to place a virtual note on a selected portion of the first or second static visual content screenshots and thereby provide specific feedback regarding the selected portion.

14. The system of claim 13 wherein the virtual note creator is operable to generate color-coded virtual notes, and wherein each color code corresponds to a specified type of feedback.

15. The system of claim 13 wherein the virtual note creator is operable to generate virtual notes that, once placed on the selected portion, are expanded or collapsed by a selection of the first or second user to view the contents thereof.

16. A method comprising:

receiving a first static visual content screenshot and a second static visual content screenshot from a first user, the first and second static visual content screenshots representing a progression of displays to be viewed in a sequence selected by the first user;

displaying a graphical user interface (GUI) to the viewing user, the GUI comprising:

(1) a first area in which the first and second static visual content screenshots are presented in the sequence to obtain feedback on the first and second static visual content screenshots from a viewing user, (2) a second area including a first link associated with the first static visual content screenshot and a second link associated with the second static visual content screenshot, wherein the first and second links provide navigation through the sequence of first and second static visual content screenshots so that a selected one of the first and second screenshots is displayed in the first area of the GUI, and (3) a third area including feedback elements selectable by the viewing user to provide feedback regarding the screenshots, the feedback elements including:

(a) a rating section that includes a pre-defined question and an associated rating scale, the rating scale operable to receive a rating selected by the viewing user and (b) a virtual note creator for the viewing user to generate a virtual note for associating user-defined text comments with a location on the static visual content screenshot in the first area of the GUI, the location defined by the viewing user;

receiving feedback information from the second user by way of the feedback elements, the feedback information including:

(i) a rating selected by the viewing user from the rating scale associated with the pre-defined question, and (ii) a user-defined text comment and associated user-specified location from a generation of a virtual note by the viewing user; and providing, to the first user, the received feedback information.

17. The method of claim 16 wherein associating the first static visual content screenshot with the first link comprises providing access to the first static visual content screenshot through the first link, and wherein associating the second static visual content screenshot with the second link comprises providing access to the second static visual content screenshot through the second link.

18. The method of claim 16 wherein providing the first link and second link to the second user comprises providing the first link and the second link in an order corresponding to a sequential order of the first static visual content screenshot and the second static visual content screenshot.

19. The method of claim 16 wherein providing the first link and second link to the second user comprises displaying the first link with another visual appearance than the second link while the first static visual content screenshot is displayed with the user interface.

20. The method of claim 16 wherein providing the first link and second link to a second user comprises providing information regarding the second static visual content screenshot in response to a selection of the second link by the second user, while the first static visual content screenshot is displayed on the user interface.

21. The method of claim 16 further comprising marking the first link on the user interface in response to receiving feedback from the second user regarding the first static visual content screenshot.

22. The method of claim 16 further comprising receiving the feedback from the second user regarding the first static visual content screenshot;
receiving revised feedback from the second user regarding the first static visual content screenshot; and
updating the feedback based on the revised feedback.

23. The method of claim 16 wherein providing feedback elements through the user interface comprises providing a virtual note creator for allowing the second user to select color-coded virtual notes for placement on selected portions of the first static visual content screenshot.

24. The method of claim 16 further comprising maintaining the first and second static visual content screenshots, a user link associated with the first user and a feedback campaign for obtaining feedback from the second user regarding the first and second static visual content screenshot, the feedback, and the feedback campaign in association with one another.

25. A user interface comprising:
a first portion for displaying a first static visual content screenshot on which feedback is sought from a viewing user;
a second portion for displaying a first link associated with the first static visual content screenshot and for displaying a second link associated with a second static visual content screenshot, the first and second static visual content screenshots representing a progression of displays to be viewed in a sequence selected by the first user, the first and second links associated with the first and second static visual content screenshots, respectively, in a feedback collection process, and wherein the first and second links provide navigation through the sequence of first and second static visual content screenshots so that a selected one of the first and second screenshots is displayed in the first portion of the user interface; and
a third portion for displaying feedback elements that are available to the viewing user for providing feedback regarding the first static visual content screenshot, the feedback elements including:
(a) a rating section that includes a pre-defined question and an associated rating scale, the rating scale operable to receive a rating selected by the viewing user,
(b) a virtual note creator for the viewing user to generate a virtual note for associating user-defined text comments with a location on the static visual content screenshot in the first area of the GUI, the location defined by the viewing user.

26. The user interface of claim 25 wherein selection of the second link by the viewing user causes display of the second static visual content screenshot within the first portion of the user interface, to thereby enable the viewing user to provide feedback regarding the second static visual content screenshot using the feedback element.

27. The user interface of claim 25 wherein an order of the first link and second link within the second portion corresponds to a sequential order of the first static visual content screenshot and the second static visual content screenshot.

28. The user interface of claim 25 wherein the first link is displayed differently from the second link within the second portion when the first static visual content screenshot is displayed within the first portion.

29. The user interface of claim 25 wherein the first link is marked in response to a submission of the feedback from the viewing user regarding the first static visual content screenshot.

30. The user interface of claim 25 wherein the third portion comprises a submit button that is displayed as a re-submit button upon submission of the feedback regarding the first static visual content screenshot, when the first static visual content screenshot is displayed in the first portion.

31. The user interface of claim 25 wherein the second link displays information about the second static visual content screenshot within the second portion, upon selection of the second link by the viewing user, while the first static visual content screenshot is displayed in the first portion.

* * * * *